(12) United States Patent
Frey et al.

(10) Patent No.: US 7,526,550 B2
(45) Date of Patent: Apr. 28, 2009

(54) UNIFIED LOGGING SERVICE WITH A LOG VIEWER

(75) Inventors: Gregor K. Frey, Lorsch (DE); Miroslav R. Petro, Sofia (BG); Martin Stein, El Granada, CA (US)

(73) Assignee: SAP AG, Walldorf (DE)

( * ) Notice: Subject to any disclaimer, the term of this patent is extended or adjusted under 35 U.S.C. 154(b) by 961 days.

(21) Appl. No.: 10/813,999

(22) Filed: Mar. 26, 2004

(65) Prior Publication Data

US 2005/0223282 A1 Oct. 6, 2005

(51) Int. Cl.
*G06F 15/173* (2006.01)
*G06F 12/00* (2006.01)

(52) U.S. Cl. .................. 709/225; 709/224; 719/238

(58) Field of Classification Search .............. 709/224, 709/225, 203, 217, 218, 229, 250
See application file for complete search history.

(56) References Cited

U.S. PATENT DOCUMENTS

| | | | |
|---|---|---|---|
| 5,201,044 A | | 4/1993 | Frey et al. |
| 5,802,291 A | * | 9/1998 | Balick et al. ............... 709/202 |
| 5,944,841 A | | 8/1999 | Christie |
| 6,026,237 A | | 2/2000 | Berry et al. |
| 6,055,492 A | | 4/2000 | Alexander, III et al. |
| 6,061,721 A | | 5/2000 | Ismael et al. |
| 6,083,281 A | | 7/2000 | Diec et al. |
| 6,118,940 A | | 9/2000 | Alexander, III et al. |
| 6,134,581 A | | 10/2000 | Ismael et al. |
| 6,144,967 A | | 11/2000 | Nock |
| 6,202,199 B1 | | 3/2001 | Wygodny et al. |
| 6,205,476 B1 | | 3/2001 | Hayes, Jr. |
| 6,230,313 B1 | | 5/2001 | Callhan, II et al. |

(Continued)

FOREIGN PATENT DOCUMENTS

JP 2001195151 7/2001

(Continued)

OTHER PUBLICATIONS

USPTO, "6570P033 FOA Mailed Sep. 3, 2008 for U.S. Appl. No. 10/815,018", Whole Document.

(Continued)

*Primary Examiner*—Zarni Maung
(74) *Attorney, Agent, or Firm*—Blakely Sokoloff Taylor & Zafman

(57) ABSTRACT

An integrated tracing and logging system for an enterprise network. One embodiment of the integrated logging and tracing system has an object-oriented architecture which includes a controller class with two sub-classes: a tracing sub-class and a logging sub-class. Instances of the tracing sub-class (tracing modules) are associated with specified program code regions of network applications. The tracing modules receive method calls from the network applications and process the method calls based on defined severity levels. Instances of the logging sub-class (logging modules) are associated with specified "categories" related to the enterprise network (e.g., system, database, etc). The logging modules receive and process method calls from network components associated with the categories. The integrated logging and tracing system may be accessed by a log viewer having a log viewer client to provide a user interface and a log viewer server to read one or more log messages.

30 Claims, 17 Drawing Sheets

U.S. PATENT DOCUMENTS

| | | |
|---|---|---|
| 6,260,187 B1 | 7/2001 | Cirne |
| 6,272,537 B1 | 8/2001 | Kekic et al. |
| 6,308,208 B1 | 10/2001 | Jung et al. |
| 6,356,931 B2 | 3/2002 | Ismael et al. |
| 6,381,735 B1 | 4/2002 | Hunt |
| 6,389,464 B1 | 5/2002 | Krishnamurthy et al. |
| 6,466,973 B2 | 10/2002 | Jaffe |
| 6,470,388 B1 | 10/2002 | Niemi et al. |
| 6,539,501 B1 | 3/2003 | Edwards |
| 6,553,403 B1 | 4/2003 | Jarriel et al. |
| 6,567,809 B2 | 5/2003 | Santosuosso |
| 6,591,228 B1 * | 7/2003 | Hall et al. .................. 702/187 |
| 6,631,515 B1 | 10/2003 | Berstis |
| 6,658,600 B1 | 12/2003 | Hogdal et al. |
| 6,662,359 B1 | 12/2003 | Berry et al. |
| 6,664,978 B1 | 12/2003 | Kekic et al. |
| 6,681,232 B1 | 1/2004 | Sistanizadeh |
| 6,708,173 B1 | 3/2004 | Behr et al. |
| 6,738,933 B2 | 5/2004 | Fraenkel et al. |
| 6,754,890 B1 | 6/2004 | Berry et al. |
| 6,772,178 B2 | 8/2004 | Mandal et al. |
| 6,789,257 B1 | 9/2004 | MacPhail |
| 6,792,460 B2 | 9/2004 | Oulu et al. |
| 6,802,067 B1 | 10/2004 | Camp et al. |
| 6,834,301 B1 | 12/2004 | Hanchett |
| 6,836,878 B1 | 12/2004 | Cuomo et al. |
| 6,851,118 B1 | 2/2005 | Ismael et al. |
| 6,857,119 B1 | 2/2005 | Desai |
| 6,862,711 B1 | 3/2005 | Bahrs et al. |
| 6,880,125 B2 | 4/2005 | Fry |
| 6,895,578 B1 | 5/2005 | Kolawa et al. |
| 6,922,417 B2 | 7/2005 | Vanlint |
| 6,925,631 B2 | 8/2005 | Golden |
| 6,934,942 B1 | 8/2005 | Chilimbi |
| 6,950,874 B2 | 9/2005 | Chang et al. |
| 6,952,726 B1 | 10/2005 | White et al. |
| 6,961,918 B2 | 11/2005 | Garner et al. |
| 6,968,540 B2 | 11/2005 | Beck et al. |
| 6,985,848 B2 | 1/2006 | Swoboda et al. |
| 6,990,601 B1 | 1/2006 | Tsuneya et al. |
| 7,000,235 B2 | 2/2006 | Mandal et al. |
| 7,017,051 B2 | 3/2006 | Patrick |
| 7,017,162 B2 | 3/2006 | Smith et al. |
| 7,024,474 B2 | 4/2006 | Clubb et al. |
| 7,051,324 B2 | 5/2006 | Gissel et al. |
| 7,058,558 B2 | 6/2006 | Reichenthal |
| 7,062,540 B2 | 6/2006 | Reddy et al. |
| 7,069,267 B2 | 6/2006 | Spencer, Jr. |
| 7,082,464 B2 | 7/2006 | Hasan et al. |
| 7,086,065 B1 | 8/2006 | Yelurpati et al. |
| 7,093,234 B2 | 8/2006 | Hibbeler et al. |
| 7,120,685 B2 * | 10/2006 | Ullmann et al. ............. 709/224 |
| 7,131,113 B2 | 10/2006 | Chang et al. |
| 7,150,014 B2 | 12/2006 | Graupner |
| 7,152,104 B2 | 12/2006 | Musante et al. |
| 7,174,370 B1 | 2/2007 | Saini et al. |
| 7,200,588 B1 | 4/2007 | Srivastava et al. |
| 7,206,827 B2 | 4/2007 | Viswanath et al. |
| 7,209,898 B2 | 4/2007 | Pfeiffer et al. |
| 7,209,963 B2 | 4/2007 | Burton et al. |
| 7,240,334 B1 | 7/2007 | Fluke et al. |
| 7,251,809 B2 | 7/2007 | Barclay et al. |
| 7,305,671 B2 | 12/2007 | Davidov et al. |
| 2002/0029298 A1 | 3/2002 | Wilson |
| 2002/0073063 A1 | 6/2002 | Faraj |
| 2002/0075325 A1 | 6/2002 | Allor et al. |
| 2002/0170036 A1 | 11/2002 | Cobb et al. |
| 2003/0005173 A1 | 1/2003 | Shah et al. |
| 2003/0110252 A1 | 6/2003 | Yang-Huffman |
| 2003/0120593 A1 | 6/2003 | Bansal et al. |
| 2003/0167304 A1 | 9/2003 | Zhu et al. |
| 2003/0177477 A1 | 9/2003 | Fuchs |
| 2003/0225872 A1 * | 12/2003 | Bartek et al. ................ 709/223 |
| 2003/0236880 A1 | 12/2003 | Srivastava et al. |
| 2004/0003122 A1 | 1/2004 | Melillo |
| 2004/0019662 A1 | 1/2004 | Viswanath et al. |
| 2004/0019669 A1 | 1/2004 | Viswanath et al. |
| 2004/0022237 A1 | 2/2004 | Elliott et al. |
| 2004/0028059 A1 | 2/2004 | Josyula et al. |
| 2004/0031020 A1 | 2/2004 | Berry et al. |
| 2004/0058652 A1 | 3/2004 | McGregor et al. |
| 2004/0064552 A1 | 4/2004 | Chong et al. |
| 2004/0078722 A1 | 4/2004 | Pfeiffer et al. |
| 2004/0123279 A1 | 6/2004 | Boykin et al. |
| 2004/0148610 A1 | 7/2004 | Tsun et al. |
| 2004/0154011 A1 | 8/2004 | Wang et al. |
| 2004/0158837 A1 | 8/2004 | Sengodan |
| 2004/0215649 A1 | 10/2004 | Whalen et al. |
| 2004/0230973 A1 | 11/2004 | Cundiff, Jr. et al. |
| 2004/0249613 A1 | 12/2004 | Sprogis et al. |
| 2004/0268314 A1 | 12/2004 | Kollman et al. |
| 2005/0010608 A1 | 1/2005 | Horikawa |
| 2005/0028171 A1 * | 2/2005 | Kougiouris et al. ......... 719/318 |
| 2005/0033777 A1 | 2/2005 | Moraes et al. |
| 2005/0038889 A1 | 2/2005 | Frietsch |
| 2005/0039171 A1 | 2/2005 | Avakian et al. |
| 2005/0039187 A1 | 2/2005 | Avakian et al. |
| 2005/0097110 A1 | 5/2005 | Nishanov et al. |
| 2005/0102536 A1 | 5/2005 | Patrick et al. |
| 2005/0132041 A1 | 6/2005 | Kundu |
| 2005/0132337 A1 | 6/2005 | Wedel et al. |
| 2005/0216584 A1 | 9/2005 | Chisholm |
| 2005/0234931 A1 | 10/2005 | Yip et al. |
| 2005/0234967 A1 | 10/2005 | Draluk et al. |
| 2005/0257157 A1 | 11/2005 | Gilboa et al. |
| 2006/0095674 A1 | 5/2006 | Twomey |

FOREIGN PATENT DOCUMENTS

| | | |
|---|---|---|
| JP | 2002073522 | 3/2002 |
| JP | 2002082777 | 3/2002 |
| WO | WO 0241154 A2 | 5/2002 |
| WO | WO 0205102 A1 | 7/2002 |

OTHER PUBLICATIONS

Burtscher, M , ""VPC3: A Fast and Effective Trace-Compression Algorithm"", *ACM*, (2004), p. 167-176.

Chander, Ajay , et al., "Mobile Code Security by Java Bytecode Instrumentation", Ajay Chander et al., *"Mobile Code Security by Java Bytecode Instrumentation"*, Proceedings of the DARPA Information Survivability Conference & Exposition DISCEX-II 2001, Jun. 12-14, 2001, Stanford University and University of Pennsylvania, [*Partially suppo, 14 pgs.

Chang, L. , et al., "A Network Status Monitoring System Using Personal Computer", Chang, L.; Chan, W.-L.; Chang, J.; Ting, P.; Netrakanti, M., *"A Network Status Monitoring System Using Personal Computer", Global Telecommunications Conference, 1989, and Exhibition*. 'Communications Technology for the 1990s and Beyond'. GLOBECOM '89., IEEE, (1989), pp. 201-206.

Cohen, Geoff A., et al., "An Architecture for Safe Bytecode Insertion", Geoff A. Cohen, et al., *Software-Practice and Experience*, [*Version: Mar. 6, 2000 v2.1*] "An Architecture for Safe Bytecode Insertion", Department of Computer Science, Duke University (27 pgs.), 27 pgs.

Cohen, Geoff A., et al., "Automatic Program Transformation with JOIE", *Paper, Departmen of Computer Science, Duke University*, 12 pages.

Dahm, Markus , "Welcome to the Byte Code Engineering Library 4.4.1", http://bcel.sourceforge.net/main.html, last updated Apr. 12, 2002, 2 pages, printed Sep. 28, 2006.

Davies, Jonathan , et al., "An Aspect Oriented Performance Analysis Environment", Jonathan Davies, et al., *Proceedings of the 2nd inter-* national conference on "An Aspect Oriented Performance Analysis Environment", 10 pgs., 2003, Boston, Massachusetts Mar. 17-21, 2003, 10 pgs.

Gagnon, Etienne, et al., "Effective Inline-Threaded Interpretation of Java Bytecode Using Preparation Sequences", Etienne Gagnon, et al., "*Effective Inline-Threaded Interpretation of Java Bytecode Using Preparation Sequences*", Sable Research Group, Universite du Quebec a Montreal and McGill University, Montreal, Canida, Jan. 23, 2003 (15 pgs.)., 15 pgs.

Gill, Peter W., "Probing for a Continued Validation Prototype", Peter W. Gill, "*Probing for a Continued Validation Prototype*", a Thesis Submitted to the Faculty of the Worcester Polytechnic Institute, May 2001, (111 pages), 111 pages.

Goldberg, Allen, et al., "Instrumentation of Java Bytecode for Runtime Analysis", Allen Goldberg, et al., "*Instrumentation of Java Bytecode for Runtime Analysis*", Fifth ECOOP Workshop on Formal Techniques for Java-like Programs, Jul. 21, 2003, Kestrel Technology, NASA Ames Research Center, Moffett Field, California USA, (9 pgs.)., 9 pgs.

Hampton, Kip, "High-Performance XML Parsing with SAX", Published on XML.com by Feb. 14, 2001.

Hart, James, ""Early Adopter: J2SE 1.4"", chapter 5, *Wrox Press*, (Sep. 2001), pp. 1-12.

Kaplan, et al., ""Flexible Reference Trace Reduction for VM Simulations"", *ACM*, (2003), p. 1-38.

Keller, Ralph, et al., "Supporting the Integration and Evolution of Components Through Binary Component Adaptation", www.cs.ucsb.edu/oocsb, Sep. 9, 1997, Technical Report TRCS97-15, 12 pages.

Lee, Han B., "BIT: Bytecode Instrumenting Tool", *University of Colorado, Department of Computer Science 1997*, 51 pages.

Lee, Han B., et al., "BIT: A Tool for Instrumenting Java Bytecodes", Han Bok Lee, et al., "*BIT: A Tool for Instrumenting Java Bytecodes*", originally published in the Proceedings of the USENIX Symposium on Internet Technologies and Systems, Monterey, California, Dec. 1997, www.usenix.org/ (11 pgs.)., 11 pgs.

Li, Wen, et al., "Collaboration Transparency in the Disciple Framework", Wen, Li, et al., "*Collaboration Transparency in the Disciple Framework*", CAIP Center, Rutgers—The State University of New Jersey, Piscataway, NJ, USA, Proceeding of the ACM International Conference on Supporting Gruop Work (Group '99) Nov. 14-17, 1999, 10 pgs.

Macrides, Nathan, "SANS Security Essentials (GSEC) Practical Assignment Version 1.4", Nathan Macrides, *Security Techniques for Mobile Code "SANS Security Essentials (GSEC) Practical Assignment Version 1.4"*, Jul. 11, 2002, (11 pgs.), 11 pgs.

McLaughlin, Brett, "Tip: Set up a SAX Parser", *Published by International Business Machines Corporation on* Jul. 2, 2003.

McNamee, Dylan, et al., "Specialization Tools and Techniques for Systematic Optimization of System Software", Dylan McNamee, et al., "*Specialization Tools and Techniques for Systematic Optimization of System Software*", Oregon Graduate Institute of Science & Technology, and University of Rennes/IRISA, ACM Transactions on Computer Systems, 2001 (30 pgs.), 30 pgs.

Nikolav, Nikolai, "Classfile Conversion Into An Organization of Objects, and Modification Thereof, To Effect Bytecode Modification", Nikolov, Nikolai, "*Classfile Conversion Into An Organization of Objects, and Modification Thereof, To Effect Bytecode Modification*", U.S. Appl. No. 10/750,396, Office Action mailed Sep. 5, 2006, The Offie Action, claims as they stood in the app.

Nikolov, Nikolai, "Execution of Modified Byte Code for Debugging, Testing And/Or Monitoring of Object Oriented Software", Nikolai Nikolov, "*Execution of Modified Byte Code for Debugging, Testing And/Or Monitoring of Object Oriented Software*", U.S. Appl. No. 10/749,617, filed Dec. 30, 2003, Ofice Action mailed Aug. 23, 2006. The Office Action, claims as they sto.

Ploesh, Reinhold, "Evaluation of Assertion Support for the Java Programming Language", Reinhold Ploesh, *Johannes Kepler University Linz, Austria, "Evaluation of Assertion Support for the Java Programming Language", JOT: Journal of Object Technology*, vol. 1, No. 3, Special Issue: Tools USA 2002 Proceedings, pp. 5-17, http://www.jot.fm/issues/, 5-17.

Rudys, Algis, et al., "Enforcing Java Run-Time Properties Using Bytecode Rewriting", Algis Rudys, et al., "*Enforcing Java Run-Time Properties Using Bytecode Rewriting*", International Symposium on Software Security (Tokyo, Japan), Nov. 2002, Rice University, Houston, TX 77005, USA (16 pgs.)., 16 pgs.

Snyder, Alan, "The Essence of Objects: Concepts and Terms", *IEEE Software*, Jan. 1993, pp. 31-42, Sunsoft, Mountain View.

Stephenson, Ben, et al., "Characterization and Optimization of Java Applications", Ben Stephenson, et al., "*Characterization and Optimization of Java Applications*" Department of Computer Science, Abstract in Western Research Forum Program & Abstracts, p. 20, 2003, p. 20.

Welch, Ian, et al., "Kava—A Reflective Java Based on Bytecode Rewriting", Ian Welch, et. al., "*KAVA—A Reflective Java Based on Bytecode Rewriting*" SpringerLink—Verlag Berling Heidelberg 2000, Chapter, Lectures Notes in Computer Science, W. Cazzola, et al. Editors, Reflection and Software Engineering, LNCS, pp. 155-167., (2000), 155-167.

Wu, et al., ""From Trace Generation to Visualization: A Performance Framework for Distributed Parallel Systems"", *IEEE*, (2000), pp. 1-18.

""EarlyAdopter_DS.pdf. Bibliographic Data for Early Adopter: J2SE 1.4"", by Wrox Press 1 pg.

"U.S. Appl. No. 10/813,788 Final Office Action Mailed Nov. 26, 2007", Whole Document.

"U.S. Appl. No. 11/026,617 Final Office Action Mailed Nov. 20, 2007".

"OA mailed Jan. 18, 2008 for U.S. Appl. No. 10/814,907", Whole Document.

"OA Mailed Feb. 21, 2008 for U.S. Appl. No. 10/815,018", Whole Document.

"FOA mailed Jun. 8, 2007 for U.S. Appl. No. 10/748,779", Whole Document.

"OA mailed Dec. 19, 2007 for U.S. Appl. No. 10/748,779", Whole Document.

"OA mailed Dec. 29, 2006 for U.S. Appl. No. 10/748,779", Whole Document.

"OA mailed Jun. 29, 2006 for U.S. Appl. No. 10/748,779", Whole Document.

"FOA mailed Oct. 16, 2007 for U.S. Appl. No. 10/748,951", Whole Document.

"OA mailed Jun. 12, 2007 for U.S. Appl. No. 10/748,951", Whole Document.

"FOA mailed Jul. 2, 2007 for U.S. Appl. No. 10/813,788", Whole Document.

"OA mailed Jan. 25, 2007 for U.S. Appl. No. 10/813,788", Whole Document.

"Adding Systems to the Availability Monitoring Manually", http://help.sap.com/saphelp_erp2004/helpdata/en/38/9e0fe5d7980fffe10000009b3810a5/c..., (SAP Library—The Alert Monitoring), (Downloaded Dec. 14, 2004), Whole Document.

"Alert Monitoring of the J2EE Engine Using CCMS", http://help.sap.com/saphelp_webas630/helpdata/en/92/ef30241c0f4a41959390a27e286ce..., Alert Monitoring of the J2EE Engine Using CCMS—SAP Library, (Downloaded Dec. 14, 2004), Whole Document.

"Availability and Performance Overview Monitor", http://help.sap.com/saphelp_erp2004/helpdata/en/ae/cd823bd26a5c42e10000000a114084..., Availability and Performance Overview Monitor (SAP Library—The Alert Monitor), (Downloaded Dec. 14, 2004), Whole Document.

"Availability Monitoring with CCMSPING", http://help.sap.com/saphelp_erp2004/helpdata/en/38/9e3337d7840ffee10000009b3810a5/..., Availability Monitoring with CCMSPING (SAP Library—The Alert Monitor), (Downloaded Dec. 14, 2004), Whole Document.

"CCMS Agents", http://help.sap.com/saphelp_nw04/helpdata/en/48/6a77607a7c91409474ad6c7b6f5a26/frameset.htm, Whole Document.

"CCMS Monitoring Architecture: Preconfigured Monitors for the Alert Monitor", *SAP Web Application Server 6.20*, (Nov. 16, 2001), Whole Document.

"CCMS: Informix", http://help.sap.com/saphelp_erp2004/helpdata/en/73/61c850800e25478d24696196a969a5/..., CCMS: Informix (SAP Library—CCMS: Informix), (Downloaded Dec. 14, 2004), Whole Document.

"Changing Monitoring Setting of Servers and Groups", http://help.sap.com/saphelp_erp2004/helpdata/en/6c/d667aa73bb9c428e9786eaf559f7ea/..., Changing Monitoring Setting of Servers and Groups (SAP Library—The Alert Monitor), (Downloaded Dec. 14, 2004), Whole Document.

"Configuring Availability Monitoring", http://help.sap.com/saphelp_erp2004/helpdata/en/38/9e100dd7980fffe10000009b3810a5/..., Configuring Availability Monitoring (SAP Library—The Alert Monitor), (Downloaded Dec. 14, 2004), Whole Document.

"Creating and Changing a Monitoring Pause", http://help.sap.com/saphelp_erp2004/helpdata/en/73/098488227c38f97c564225737108c/..., Creating and Changing a Monitoring Pause (SAP Library—The Alert Monitor), (Downloaded Dec. 14, 2004), Whole Document.

"Creating and Changing Monitoring Rules", http://help.sap.com/saphelp_erp2004/helpdata/en/40/17fd8c1754324b81da9027f1bdbb75/..., Creating and Changing Monitoring Rules (SAP Library—The Alert Monitor), (Downloaded Dec. 14, 2004), Whole Document.

"Debugging J2EE Applications", *Sun Microsystems, Java—J2EE 1.4 Application Server Deveoper's Guide, "Debugging J2EE Applications" Chapter 4*, http://java.sun.com/j2ee/1.4_docs/devguide/dgdebug.html, 2003, printed Jul. 2, 2004 (11 pgs.), 11 pgs.

"How Introscope Works", Wily Technology, Inc., Wily Solutions *"How Introscope Works"—Enterprise Application Mangement*, http://www.wilytech.com/solutions/products/howWorks.html, 1999-2004, printed Jul. 2, 2004 (1 page)., 1 page.

"Installing and Registering CCMS Agents", http://help.sap.com/saphelp_nw04/helpdata/en/48/6a76607a7c91409474ad6c7b6f5a26/frameset.htm, SAP Library, (Downloaded Dec. 14, 2004), Whole Document.

"Installing Availability Agent CCMSPING", http://help.sap.com/saphelp_erp2004/helpdata/en/79/498e3bae1d9e7ae10000000a114084..., Installing Availability Agent CCMSPING (SAP Library—The Alert Monitor), (Downloaded Dec. 14, 2004), Whole Document.

"Java Logging Overview", (Nov. 2001), pp. 1-9.

"Jikes Bytecode Toolkit: Overview", *Alphaworks*, www.alphaworks.ibm.com/tech/jikesbt, posted Mar. 31, 2000, 2 pages, printed Sep. 28, 2006.

"Mobile-Code Security Mechanisms for Jini", *Mobile-Code Security Mechanisms for Jini—"Mobile-Code Security Mechanisms for Jini" Download code, DISCEX 2001 Paper*, http://theory.stanford.edu/people/jcm/software/jinifilter.html, printed Jul. 2, 2004—(3 pgs.), (2001), 3 pgs.

"Monitoring", http://help.sap.com/saphelp_webas630/helpdata/en/68/f4bc3deaf28d33e10000000a11405..., Monitoring (SAP Library—J2EE Technology in SAP Web Application Server), (Downloaded Dec. 14, 2004), Whole Document.

"Operating System Monitor", http://help.sap.com/saphelp_nw04/helpdata/en/55/b5b93b5bb3493fe10000000a114084/frameset.htm, SAP Library, (Downloaded Dec. 14, 2004), Whole Document.

"Package Gnu.Bytecode", *Package Gnu.Bytecode*, http://sources.redhat.com/kawa/api.gnu/bytecode/package-summary.html, 4 pages, printed Sep. 28, 2006.

"The Alert Monitor", http://help.sap.com/saphelp_nw2004s/helpdata/en/28/83493b6b82e908e10000000a11402f/content.htm, SAP Library, (Downloaded Dec. 14, 2004), Whole Document.

"The Java Object Instrumentation Environment", *Duke University*, www.cs.duke.edu/ari/joie/, last updated May 2003, printed Sep. 28, 2006, 2 pages.

"The Monitoring Architecture: Concept", http://help.sap.com/saphelp_nw04/helpdata/en/c4/3a7da1505211d189550000e829fbbd/frameset.htm, SAP Library, (Downloaded Feb. 27, 2008), Whole Document.

"The SAP J2EE Engine Monitoring Architecture", http://help.sap.com/saphelp_webas630/helpdata/en/6b20165833fa43b28f0349a4d3108..., The SAP J2EE Engine Monitoring Architecture (SAP Library—J2EE Technology in SAP . . . , (Downloaded Dec. 14, 2004), Whole Document.

"The Source for Developers: Core Java Java Management Extensions (JMX)", *Sun Microsystems, Inc., "The Source for Developers: Core Java Java Management Extensions (JMX)"* 2 pages, http://java.sun.com/products/JavaManagement/printed 4-2-04.. (Apr. 2, 2004), 2 pages.

"The Wily 5 Solution—Enterprise Aplications are Your Business", *Wily Technology, Inc., Wily Technology, Inc., Wily Solutions "The Wily 5 Solution—Enterprise Aplications are Your Business"*, http://www.wilytech.com/solutions/ibm_family.html, 1999-2004, printed Jul. 2, 2004 (2 pgs.), 2 pgs.

"Wily Introscope", *Wily Technology, Inc., Wily Solutions "Wily Introscope"—Enterprise Application Management*, http://www.wilytech.com/solutions/products/introscope.html, 1999-2004, printed Jul. 2, 2004 (2 pgs.), 2 pgs.

Affeldt, Reynald, et al., "Supporting Objects in Run-Time Bytecode Specialization", Reynald Affeldt, et al., *"Supporting Objects in Run-Time Bytecode Specialization", Department of Graphics and Computer Science, University of Tokyo, ASIA-PEPM '02*, Sep. 12-17, 2002, *ACM*, pp. 50-60., 50-60.

Burtscher, et al., ""Automatic Generation of High-Performance Trace Compressors"", *IEEE*, (2005), p. 1-12.

* cited by examiner

| MIN | 0 | Minimum restriction |
|---|---|---|
| DEBUG | 100 | For debugging purpose, with extensive and low level information |
| PATH | 200 | For tracing the execution flow, e.g., used in the context of entering and leaving a method, looping and branching operations |
| INFO | 300 | Informational text, mostly for echoing what has been performed |
| WARNING | 400 | Application can recover from anomaly, and fulfill the desired task, but need attention from developer/operator |
| ERROR | 500 | Application can recover from error, but cannot fulfill desired task due to the error |
| FATAL | 600 | Application cannot recover from error, and the severe situation causes fatal termination |
| MAX | 700 | Maximum restriction |

*Fig. 6a*

| ALL | 0 | Output messages of all severity |
|---|---|---|
| NONE | 701 | No messages will be logged |

*Fig. 6b*

Location "com.sapmarkets.usermanagement"

Assign severity threshold to WARINiG level
com.sapmarkets.usermanagement.severity = WARNING
                        ↑712        ↑714  ↑716

Now, specify Console as the destination to 'usermanagement'
com.sapmarkets.usermanagement.logs = ConsoleLog
                        ↑712        ↑722        ↑724

710 →  (points to first block)
720 →  (points to second block)

Jan 3, 2002 6:54:18 PM com.sapmarkets.usermanagement.ClassA.method1[main] Warning: xxxxxxxx ....

Jan 3, 2002 6:54:18 PM com.sapmarkets.usermanagement.ClassB.method2 [main] Fatal: Unable to ....

FIG. 7b

```
                              ←815
com.sapmarkets.usermanagement.severity    = WARNING

Now, push messages simultaneously to 2 destinaions:
a console and an output file                      ←825
represented by a variable notation                     ←830
com.sapmarkets.usermanagement.logs  = log[Console], log[File1]

Set up a FileLog, for storing trace, with <id>: 'File1'
'C:\\temp\\myTrace.txt' or 'C:/temp/myTrace.txt'
Dumping messages with the default format of TraceFormatter
log[File1]                  = FileLog
log[File1].pattern          = C:\\temp\\myTrace.txt
log[File1].formatter        = TraceFormatter

Set up a ConsoleLog, with <id>: 'Console'
Dumping message with self-defined format of TraceFormatter
log[Console]                = ConsoleLog        ←845
log[Console].formatter      = formatter[TraceNoDate]
                                                 }840

Set up a TraceFormatter, with <id>: 'TraceNoDate'
and its pattern starts with the Severity level, and consists no date/timestamp
formatter[TraceNoDate]            = TraceFormatter          ←860
formatter[TraceNoDate].pattern    = %s:  %-30l  [%t]:  %m
                                    ↑    ↑      ↑      ↑
                                   861  862    863    864
```

UNIFIED LOGGING SERVICE WITH A LOG VIEWER

TECHNICAL FIELD

Embodiments of the invention generally relate to the field of data processing systems and, more particularly, to a system and method for a unified logging service having a log viewer.

BACKGROUND

Logging is employed within virtually all data networks. "Logging" refers generally to recording network-related and/or application-related information in response to one or more predefined network/application events. For example, when an end-user opens a TCP connection to a server, or unsuccessfully attempts to gain access to network resources (e.g., by attempting to log in to a particular server), this information is typically recorded as an entry within a log file. Similarly, if a variable within an application rises above a specified threshold value, a log entry indicating the value and the date and time that the threshold value was exceeded may be stored within a log file. Logging techniques may be employed to record any specified network/application event. Network administrators may then review the log files to identify security issues and/or troubleshoot network problems.

Logging functionality is provided within the Java™ 2 Standard Edition ("J2 SE™") platform and the Java 2 Enterprise Edition "J2EE™", platform. Referring to FIG. 1, in a Java environment, Java applications 101 make logging calls on "logger" objects 110, 112, 114. Each logger object is used to log messages for a specific system or application component. Loggers are normally named using a hierarchical dot-separated namespace. Logger names can be arbitrary strings, but they are typically based on the package name or class name of the logged component (e.g., such as java.net or javax.swing). In addition, it is possible to create "anonymous" loggers that are not stored in the logger namespace. Loggers are organized in a hierarchical namespace in which child loggers 112, 114 may inherit logging properties from their parents 110 in the namespace.

Each logger 110, 112, 114 may have a threshold "Level" associated with it which reflects a minimum defined logging value (e.g., priority level) that the logger cares about. If a logger's level is set to null, then its effective level is inherited from its parent, which may in turn obtain it recursively from its parent, and so on up the tree.

In response to logging calls from applications 101, the logger objects 110, 112, 114 allocate Log Record objects which are passed to handler objects 130 for publication. For example, a first type of handler object may write log records to an output stream, a second type of handler object may write log records to a file (or to a set of rotating log files) and a third handler may write log records to remote TCP ports. Developers requiring specific functionality may develop a handler from scratch or subclass one of the handlers in J2SE.

Both loggers 110, 112, 114 and handlers 130 may use filters 120, 121 to filter out certain designated types of log records. In addition, when publishing a log record externally, a handler may optionally use a formatter 122 to localize and format the message before writing it to a particular destination. For example, J2SE includes a "simple formatter" for writing short "human-readable" summaries of log records and an eXtensible Markup Language (XML) formatter for writing detailed XML-structured information.

"Tracing" is a technique used primarily by software developers to track the execution of program code. For example, when developing an application, developers trace the execution of methods or functions within certain modules to identify problems and/or to determine if the program code may be improved. If a particular method takes an inordinate amount of time to complete, the developer may determine the reasons why and/or change the program code to operate more efficiently.

Developers use trace tools to trace the execution of program code. Trace tools are proprietary application programs which use different techniques to trace the execution flows for an executing program. One technique, referred to as event-based profiling, tracks particular sequences of instructions by recording application-generated events as they occur. By way of example, a trace tool may record each entry into, and each exit from, a module, subroutine, function, method, or system component within a trace file (e.g., a time-stamped entry may be recorded within the trace file for each such event). Trace events may also be sent to a console or other output destination.

Thus, tracing and logging techniques rely on similar event-based triggers, employ similar messaging techniques and record log/trace events to similar output destinations (e.g., trace/log files, consoles, . . . , etc.) in a substantially similar manner. As such, it would be beneficial to develop an integrated application programming interface which takes advantage of the similarities of tracing and logging operations, and of the synergistic effects of handling both, while not neglecting the differences.

SUMMARY OF THE INVENTION

An integrated tracing and logging system for an enterprise network is described. One embodiment of the integrated logging and tracing system has an object-oriented architecture which includes a controller class with two sub-classes: a tracing sub-class and a logging sub-class. Instances of the tracing sub-class (tracing modules) are associated with specified program code regions of applications. The tracing modules receive method calls from the applications and process the method calls based on defined severity levels. Instances of the logging sub-class (logging modules) are associated with specified "categories" related to the enterprise network (e.g., system, database, etc.). The logging modules receive and process method calls from network components associated with the categories. The integrated logging and tracing system allows tracing and logging information to be collected and correlated in a variety of useful ways. In an embodiment, the integrated logging and tracing system may be accessed by a log viewer having a log viewer client to provide a user interface and a log viewer server to read one or more log messages.

BRIEF DESCRIPTION OF THE DRAWINGS

Embodiments of the invention are illustrated by way of example, and not by way of limitation, in the figures of the accompanying drawings in which like reference numerals refer to similar elements.

FIGS. 6a-b illustrate severity levels associated with tracing and logging controllers according to one embodiment of the invention.

FIG. 7a illustrates selected elements of an exemplary configuration file 700, according to an embodiment of the invention.

FIG. 7b illustrates a default log/trace message format as defined by configuration file 700.

FIG. 8 illustrates selected elements of an exemplary configuration file 800, according to an embodiment of the invention in which the message format is configurable.

FIG. 13a illustrates an exemplary GUI 1300 for conducting searches of log messages, according to an embodiment of the invention.

FIG. 13b illustrates an exemplary GUI 1350 for displaying search results for searches conducted according to an embodiment of the invention.

FIG. 14 illustrates an exemplary GUI 1400 for merging log messages, according to an embodiment of the invention.

DETAILED DESCRIPTION

Embodiments of the invention are generally directed to an integrated logging and tracing system having a log viewer. One embodiment of the integrated logging and tracing system has an object-oriented architecture which includes a controller class with two sub-classes: a tracing sub-class and a logging sub-class. Instances of the tracing sub-class (tracing modules) are associated with specified program code regions of applications. The tracing modules receive method calls from the applications and process the method calls based on defined severity levels. Instances of the logging sub-class (logging modules) are associated with specified "categories" related to the enterprise network (e.g., system, database, etc). The log viewer may provide access to one or more log/trace messages generated by the integrated logging and tracing system. As is further described below, in an embodiment, the log viewer includes a log viewer client to provide a user interface and a log viewer server to read (and process) the one or more log/trace messages.

Figure 1:
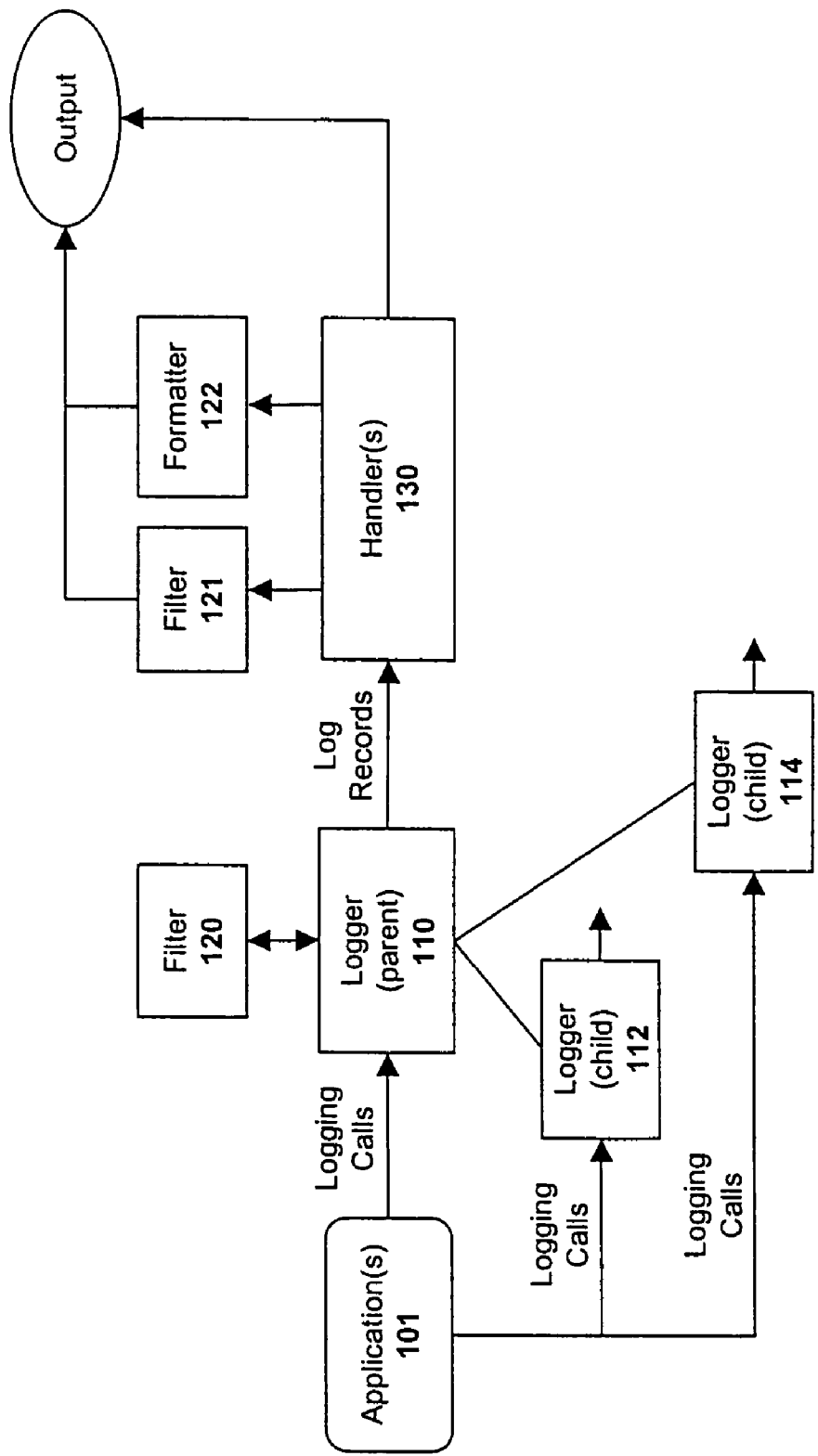
FIG. 1 illustrates a prior art system for performing logging operations.
Figure 2:
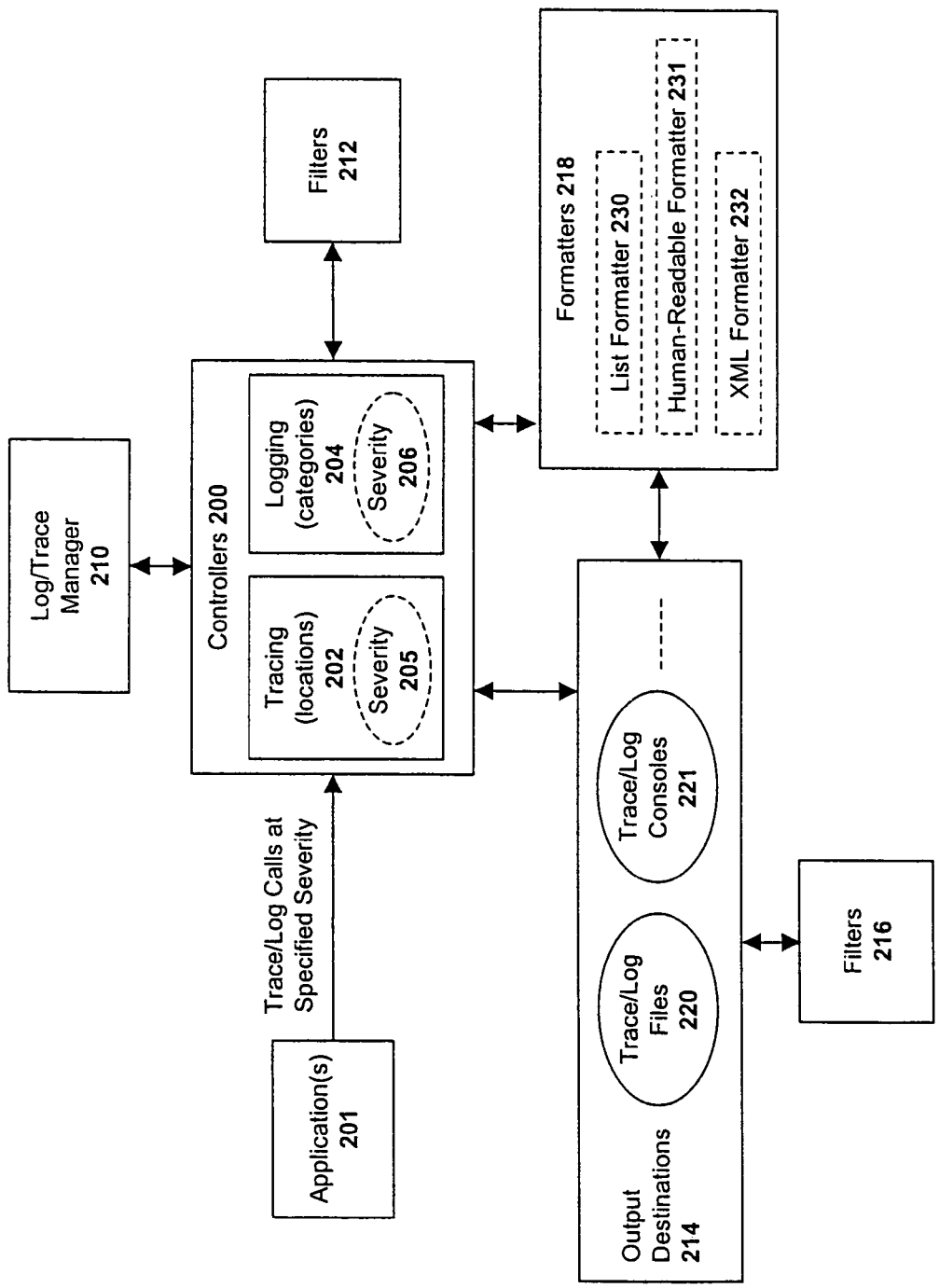
FIG. 2 illustrates a system for performing both logging and tracing operations according to one embodiment of the invention.

A system architecture according to one embodiment of the invention is illustrated in FIG. 2. The architecture includes a plurality of controllers 200 managed by a log/trace manager 210. The controllers 200 are configured to process trace/logging events generated by a plurality of different applications 201. As used herein, the term "application" is used broadly to refer to any type of program code executed on a computer and/or transmitted over a network (e.g., using a particular network protocol). One embodiment of the invention is implemented in an object-oriented programming environment such as Java (e.g., within a Java 2, Enterprise Edition (J2EE) platform/engine). In this embodiment, each of the modules illustrated in FIG. 2 are represented by objects and/or classes. The classes and/or objects of this embodiment comprise an Application Programming Interface ("API") usable to configure logging and/or tracing operations within a Java environment. It should be noted however, that the underlying principles of the invention are not limited to any particular programming environment.

In one embodiment, each controller 200 is an instance of a defined "controller" class (e.g., a Java class) which includes two sub-classes, a "tracing" sub-class and a "logging" sub-class (described in detail below), which provide features specific to tracing and logging operations, respectively. In an object-oriented environment such as Java, the tracing controller 202 illustrated in FIG. 2 represents an instance of the tracing sub-class and the logging controller 204 represents an instance of the logging sub-class. In one embodiment of the invention, tracing controllers 202 are associated with program code locations (e.g., locations within packages, classes, . . . , etc.) whereas logging controllers 204 are associated with system categories (e.g., logical system categories such as database, network, . . . , etc.).

The Controller Class

The controller class provides methods for associating log/trace output destinations with specific controllers 200 and for controlling the actual writing of log/trace messages. When a method is called, the writing of the log/trace message to a log/trace file 220, console 221 or other output destination 214 depends on the severity level associated with the message, the severity settings 205, 206 of the relevant controller(s) 200, and the filtering configuration of one or more optional filters 212, 216. For example, in one embodiment, messages having a severity level greater than or equal to the effective severity of the relevant controller 200 are candidates for output and are forwarded to the output destinations 214 attached to the controller 200 (e.g., assuming that the messages are not filtered by one of the filters 212, 216).

A variety of different severity levels may be defined. In one embodiment of the invention, illustrated in FIG. 6a, the following severity levels are defined (from lowest to highest severity level): MINIMUM, DEBUG, PATH, INFO, WARNING, ERROR, FATAL, and MAXIMUM. The general description for each severity level is set forth in FIG. 6a. In addition, as illustrated in FIG. 6b, in one embodiment, logging and tracing may be totally enabled or disabled using the severity settings of ALL or NONE, respectively. As indicated in the second column of FIGS. 6a-b, each of the descriptive threshold levels may have an associated numeric value (e.g., DEBUG=100, PATH=200, . . . , etc.).

Before (or after) evaluating the trace/log message based on severity, filters 212 associated with the controller 200 may filter the messages based on predefined filtering criteria. By way of example, if a particular controller 200 is capable of writing to both a file and a console, a filter 212 may be assigned to filter messages directed to the file, thereby limiting output to the console only. Thus, using filters, a finer granularity of log controller 200 output may be defined, using variables other than severity. As illustrated in FIG. 2, filters may be associated with particular log controllers 200 and/or with specific output destinations 214 (e.g., specific log/trace files). As mentioned above, filters may be associated with both controllers 200 and/or output destinations 214 to further restrict or alter the output tracing and logging behavior. In one embodiment, multiple filters having different filtering criteria may be allocated to each controller 200 and/or destination 214.

The Logging Sub-Class

As mentioned briefly above, in one embodiment, the logging operations performed by the logging controller 204 are associated with particular "categories" which may identify, for example, semantical topics which correspond roughly to administration tasks or problem areas. Typical areas identified by categories may include databases, networking, security and auditing.

In one embodiment, categories are named according to the hierarchical structure known from file systems on the network. For example, referring to FIG. 3, all categories of log messages associated with the system 311 may be logically grouped into sub-categories, such as database 312 or networking 313, identified by the names "/System/Database" and "/System/Network," respectively. In this example, the category "/System" 311 is the parent of categories "/System/Database" and "/System/Network," and therefore passes on its settings (e.g., severity thresholds) and attached output destinations 214 to both of them. One benefit to this arrangement is that if all log messages are to be written to the same log file, the log file does not necessary need to be directly associated with both the database 312 and networking 313 categories, but simply to the common parent, System 311.

The Tracing Sub-Class

In one embodiment, in contrast to logging operations which are associated with categories, tracing operations performed by the tracing controllers 202 are associated with particular program code locations, identified by particular package, class, or, function names. For example, in a Java environment, locations may be named according to the hierarchical structure known from Java packages.

Figure 3:
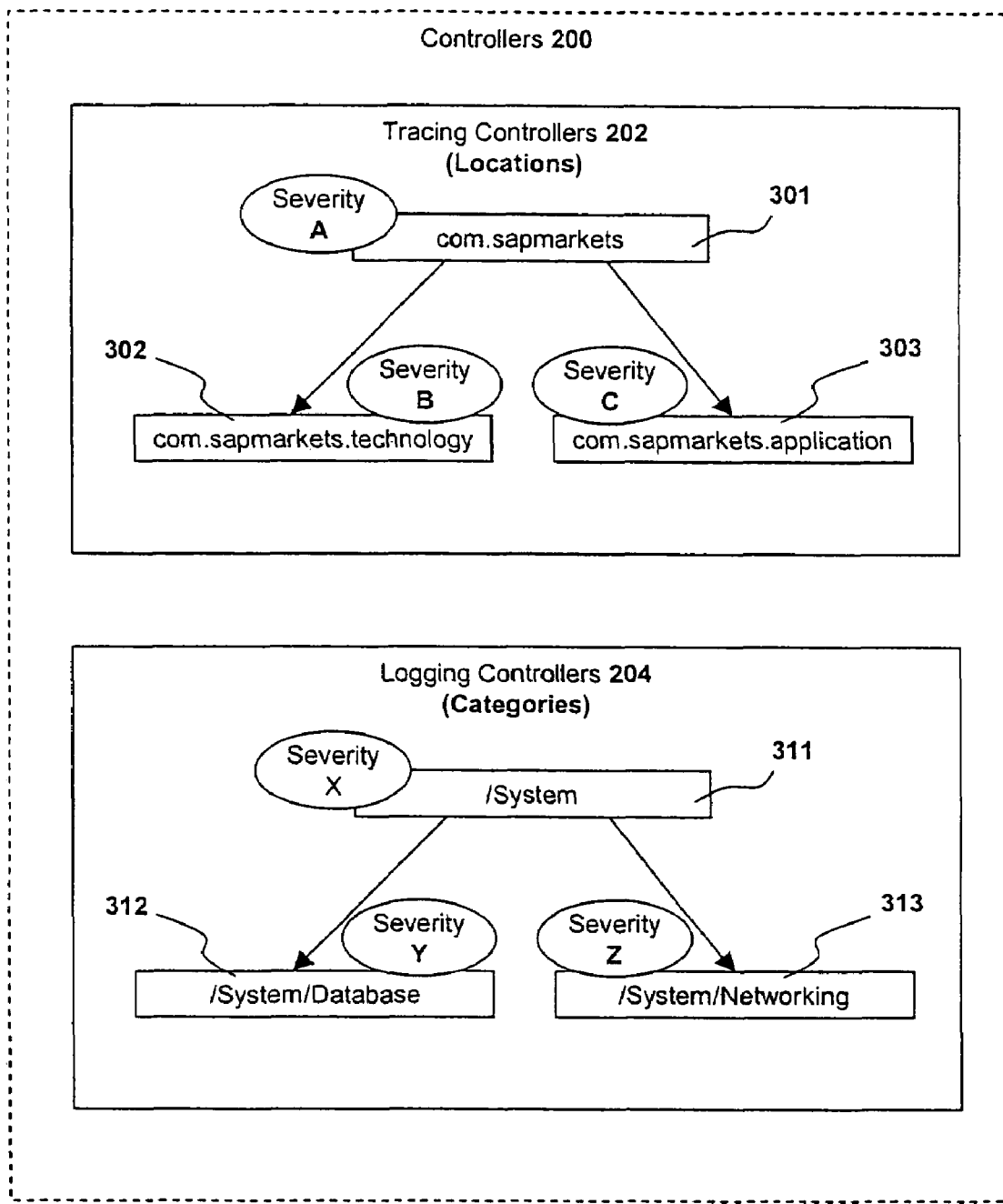
FIG. 3 illustrates hierarchical relationships among tracing and logging controllers according to one embodiment of the invention.

In the example illustrated in FIG. 3, the location "com.sapmarkets" 301 is logically grouped into technology and application sub-locations, identified by the controller names "com.sapmarkets.technology" 302 and "com.sapmarkets.application" 303, respectively. In this example, the location "com.sapmarkets" 301 is the parent of locations "com.sapmarkets.technology" 302 and "com.sapmarkets.application" 303," and therefore passes on its settings (e.g., severity thresholds) and attached output destinations 214 to both of them. As with the logging controllers, a benefit to this configuration is that if all trace messages are to be written to the same trace file, the trace file does not need to be directly associated with both the technology and application locations, but simply to the common parent, "com.sapmarkets" 301.

As an additional example, to write all the messages from monitoring classes into a single log, the location named "com.sap.tc.monitoring" may be called. All the messages from technology components (TC) may be directed to a common trace destination by simply assigning that destination to the parent location "com.sap.tc." The trace output destination is then passed on to all child locations (e.g., to "com.sap.tc.monitoring"). Moreover, it is possible to include method signatures in location names. For example, "com.sap.tc.monitoring.Node.announce(java.lang.Object)" is a location for a method named "announce" with an argument of the class Object. In this way, overloaded methods can be identified and, by adding another suffix to such a name, even classes local to them. In a Java environment, the hierarchical components of the name should be compliant with Java identifier syntax, but illegal characters may be used, bracketing a component with single quotes (e.g., com.sap. 'great.technology').

In one embodiment, all locations are accessed via a defined static method "Location.getLocation." In one embodiment, the static method need not be called each time a trace message is to be generated. Instead, each class defines static fields to hold all the needed locations, and uses these fields to call logging/tracing methods.

Controlling Severity Settings Using Inheritance

In one embodiment, the various controllers 200 are arranged into logical hierarchies in which each child controller inherits properties from its parent (e.g., its severity settings and its output destinations 214). The effective severity of a child log controller is calculated from minimum and maximum defined severities, as well as the effective severity of its parent. The minimum severity setting specifies the minimum severity value for the trace/log messages to be output via the child log controller. That is, if the effective severity of the parent log controller is higher than the minimum severity of the child, then the child inherits the parent's effective severity; otherwise the effective severity is set to the minimum severity.

By contrast, the maximum severity represents the severity that trace/log messages must have for output to be guaranteed (notwithstanding intervention from filters). For example, if the effective severity of the parent log controller is lower than the maximum severity of the child then the child inherits the parent's effective severity; otherwise the child's effective severity is set to the maximum severity. This implies that if both minimum and maximum severity are set to the same value, the effective severity is set to that value regardless of the effective severity of the parent. Such a setting is therefore called dominant. For root log/trace controllers the setting must be dominant, as separate minimum and maximum values are meaningless without a parent to inherit from.

Figure 4:
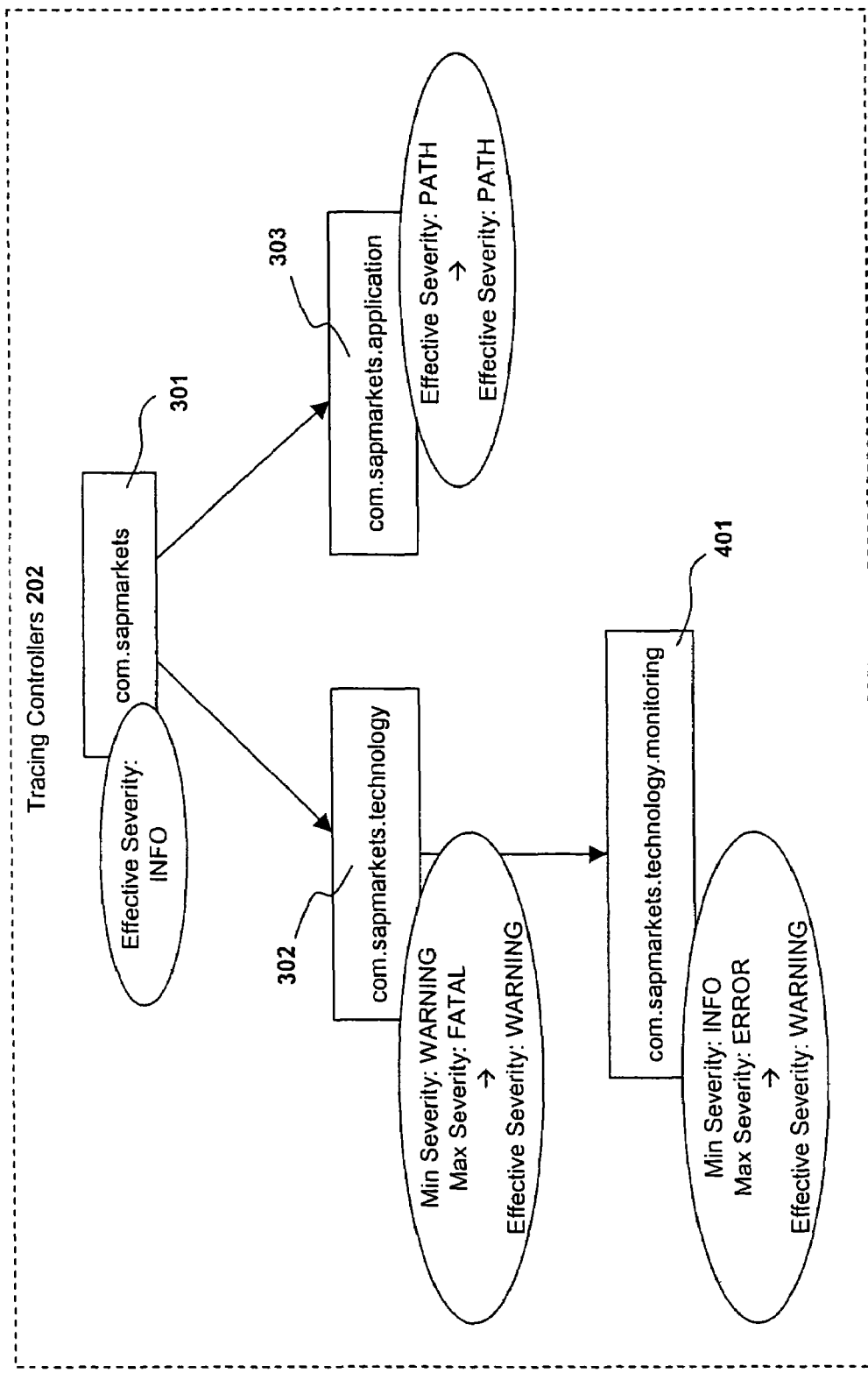
FIG. 4 illustrates one embodiment of the invention in which severity settings of trace/log controllers are configured using inheritance.

FIG. 4 illustrates an exemplary set of tracing controllers 202 which are configured through inheritance. Specifically, tracing controller "com.sapmarkets," the root controller, is configured with an effective severity of INFO. Controller "com.sapmarkets.technology" 302, a child of controller 202, is programmed with a minimum severity level of WARNING and a maximum severity level of FATAL. Because the effective severity of parent controller 301 is lower than the minimum severity setting of child controller 302, the effective severity of the child controller 302 is its minimum severity setting, WARNING.

Similarly, tracing controller "com.sapmarkets.technology.monitoring" 401, is programmed with a minimum severity of INFO and a maximum severity of ERROR. Accordingly, because the effective severity of its parent controller 302 (WARNING) is higher than its minimum severity, INFO, and lower than its maximum severity, ERROR, tracing controller 401 inherits its parent's effective severity of WARNING.

By contrast, tracing controller "com.sapmarkets.application" 303 is manually configured with an effective severity of PATH, which overrides the effective severity of INFO inherited from its parent tracing controller "com.sapmarkets" 301.

It should be noted, of course, that the specific details set forth above are used merely for the purpose of illustration.

The underlying principles of the invention are not limited to any particular logging/tracing controller hierarchy or any particular severity settings.

Output Formatters

As illustrated in FIG. 2, one embodiment of the invention includes a plurality of log/trace formatters 218 to format the results of the log/trace controllers 200, for example, based on the specified destination to which the controller output is directed. Three formatters are illustrated in FIG. 2: a list formatter 230, a human-readable formatter 231, and an eXtensible Markup Language (XML) formatter 232.

In one embodiment, the list formatter 230 translates the output of the log/trace controllers into a format which may be further processed by an application, e.g. a log viewer, instead of being read directly by an end-user. In one embodiment, the format generated by the list formatter comprises hash-separated fields which may be readily interpreted by the other applications. For example: "#1.3#10.48.27.165:4A5AB2: E99D42D4F4:-8000#Mon Jan 01 22:00: 00PDT2001#com.sapmarkets.FooClass#com.sapmarkets. FooClass.fooMethod#ma in##0#0#Fatal##Plain###A sample fatal message#."

As its name suggests, the human readable formatter 231 translates the output of the log/trace controllers into a human-readable format (e.g., ASCII text). As such, this formatter may be used when users/administrators need to quickly understand what is occurring within a network or application. For example, the human readable formatter 231 may provide its formatted output to a trace/log console for immediate viewing.

The markup language formatter 232 translates the output of the log/trace controllers into a particular markup language such as the extensible Markup Language ("XML") format which may be interpreted by any application that includes support for XML (e.g., Microsoft Word).

Relationship Between Logging and Tracing Operations

Messages associated with a particular category may also be associated with (e.g., may be written with respect to) a source code area, or location, such as a component, a package, a class or a method. As the location may be associated with a particular tracing controller, the same method call can write a message simultaneously to, for example, the database log as well as to the location trace responsible for that part of the source code (e.g., save for the location having an appropriate severity setting). In one embodiment of the invention, both the trace message and the log message are generated with the same identification in order to facilitate cross-referencing among location and category logs. At the same time, the location provides a location description, that is a string, to the log message written to the database log. This may become tedious when a class implements a large number of methods. Therefore, as described in greater detail below, for each logging/tracing method there is a version which takes in an additional parameter, referred to herein as "subloc," which is a string that serves as suffix to the name of the used location, thus providing the option to give a complete location name whilst avoiding clutter.

Examples of Tracing/Logging Operation

For the purpose of illustration, one particular tracing/logging example will now be described with respect to the method outlined in FIG. 5. The example describes how tracing/logging may be enabled and configured within the architecture illustrated in FIGS. 2-4. Briefly, the method is comprised of: identifying the source code area for which trace/log output is desired (501); assigning severity levels to the source code (502); specifying the output destination for the logs/traces (503); and inserting messages with corresponding severity levels (504).

The following sample code will be used for the example:

```
package com.sap.fooPackage;
import com.sap.tc.logging.*;
  public class Node {
    private static final Location loc =
    Location.getLocation("com.sap.fooPackage.Node");
    public void announce(Object o) {
      String method = "announce(java.lang.Object)";
      loc.entering(method);
      try {
        // do something . . .
        loc.debugT(method, "Connecting to ...");
      }
      catch (Exception e) {
        loc.fatalT(method,
               "Error processing object {0}",
               new Object[ ] {o});
      }
      loc.exiting( );
    }
  }
```

Method elements 502 and 503 are not shown at this point, but assuming the severity level is set to be Severity.ALL (accept all severity levels and output everything) and output has been formatted using a human-readable formatter (e.g., and sent to a console) the output may look like the following:

```
May 3, 2001 6:54:18 PM
com.sap.fooPackage.Node.announce [main]   Path:
Entering method
May 3, 2001 6:54:18 PM
com.sap.fooPackage.Node.announce [main]   Debug:
Connecting to ... .
  May 3, 2001 6:54:18 PM
  com.sap.fooPackage.Node.announce [main]   Path:
  Exiting method
```

Figure 5:
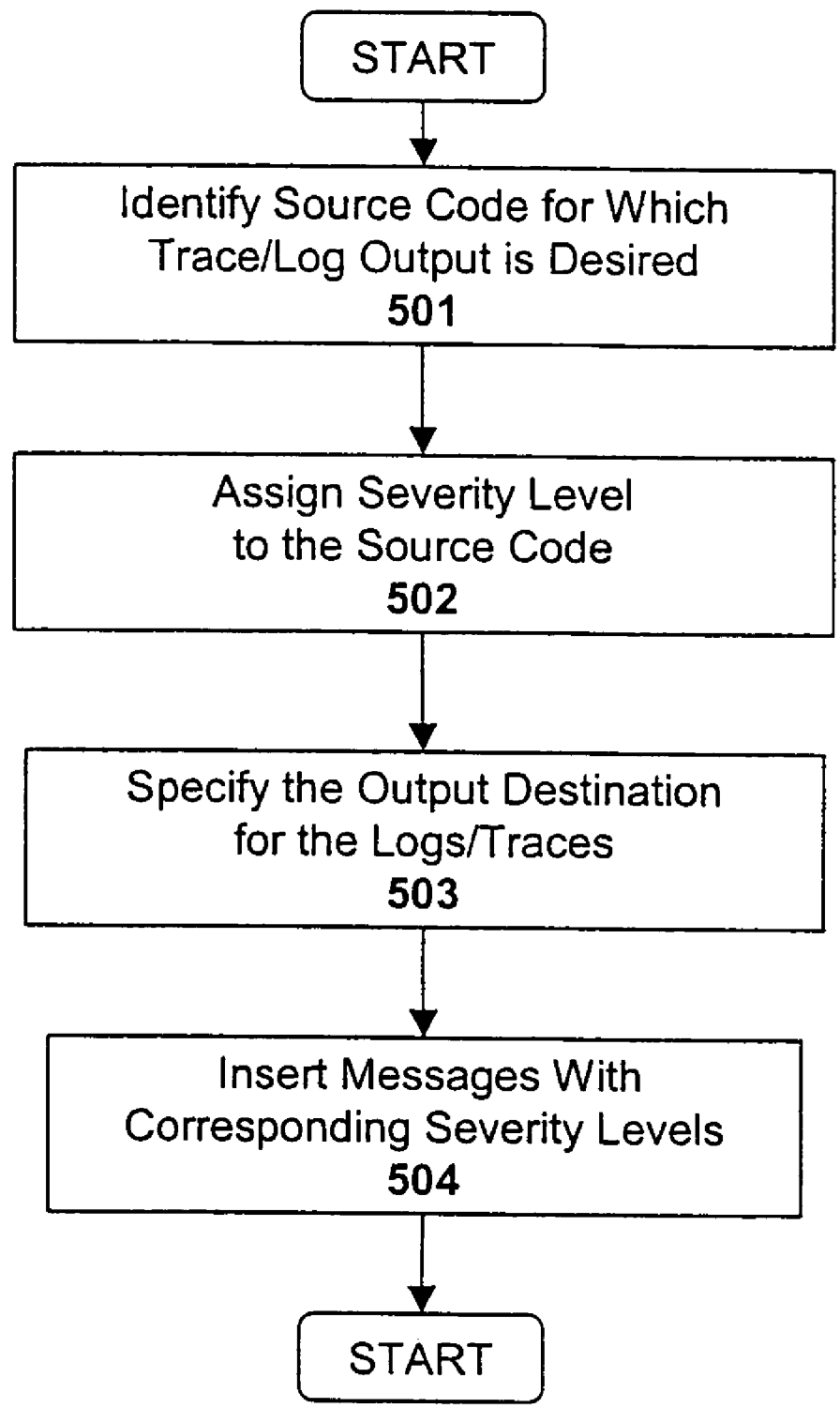
FIG. 5 illustrates a method for configuring logging and tracing according to one embodiment of the invention.

The following four sections will further explain each step illustrated in FIG. 5.

Identifying the Source Code Area (501)

As described above, the tracing subclass and the logging subclass are subclasses of the controller class. The tracing subclass is sometimes referred to below as the "Location" subclass and the logging subclass is sometimes referred to below as the "Category" subclass. Recall that Location is the source area that generates trace messages. Typically, it corresponds to the source code structure, and can be attached to the level of component, package, class or method. Category is the source area that generates log messages, corresponding to a distinguished problem area, such as networking, system and database.

Although the naming of a Location and Category may be quite flexible, as a general rule, a valid hierarchical naming convention may be useful. A common naming practice for Location is to use the full path of Java package name (See, e.g., FIGS. 3-4). For the purpose of this example, the following static methods are provided for each class for easy access to a Location or Category:

```
Location.getLocation(<name of the Location>);
Category.getCategory(<name of the Category>).
```

Alternatively, instead of passing the name manually, for Location the class instance may be passed (java.lang.Object) or the class itself (java.lang.Class). In either case, the Location object is by default referring to the class level, while using the string argument (java.lang.String) provides flexibility in the definition (e.g., to also include the method name to explicitly control logging over methods individually).

Once identified, the source is ready to be configured to generate messages. In one embodiment, the handle may be configured to be static to improve efficiency:

```
"static final Location loc = Location.getLocation
    (this.getClass( ))."
```

Assign Severity to Source (502)

Recall that the severity levels employed in one embodiment of the invention are set forth in FIG. 6*a-b*. Thus, the following predetermined constants may be used: Severity.DEBUG, Severity.PATH, Severity.INFO, Severity. WARNING, Severity.ERROR, Severity.FATAL Severity.MAX, Severity.ALL and Severity.NONE. The severity may be assigned to the specified source using the following method: "loc.setEffectiveSeverity (Severity. INFO);." Using this configuration, any messages with severity lower than INFO will be discarded. Others will be directed to the destination. The concepts associated with hierarchical severity were described above with respect to FIG. 4. Because of the hierarchical naming features of location or category, significant amount of time may be saved by assigning severity levels to the parent of a plurality of children. The children will then automatically inherit the assigned severity as well.

```
static final Location loc =
    Location.getLocation(com.sap.fooPackage);
    loc.setEffectiveSeverity(Severity.INFO);
```

In one embodiment, by default, the source object (assuming the ascendant has not been assigned a severity level yet) is assigned Severity.NONE. As such, a developer may freely enable the output methods in the source code, but the actual logging is not activated until it is explicitly "switched on" when ready.

Specify Output Destination (503)

An output destination such as a log/trace file, a console, an output stream, etc, is assigned to each Location sub-controller or Category sub-controller. This can be accomplished via a method such as the following:

```
"loc.addLog(<log1>);."
```

There may be instances in which it is desirable to assign multiple output destinations to a single sub-controller. In such a case, a message generated from the sub-controller will be sent to all assigned output destinations simultaneously (e.g., to both a console and a file). This may be accomplished using the following:

```
"loc.addLog(new ConsoleLog( ))"; and loc.addLog(new
    FileLog("C:\\temp\\testOutput.log")."
```

In one embodiment, as a default configuration, console output destinations 221 are assigned human-readable formatters 231 and file output destinations 220 are assigned list formatters 230. Of course, the default configurations are not required. For example, to switch to an XML Formatter for a file output, the following exemplary method may be called: "loc.addLog(new FileLog("C:\temp\testOutput.log", new XMLFormatter( ))." In an embodiment in which a file log already exists the following exemplary method may be called: "<filelog>.setFormatter(new XMLFormatter( ))."

Enable Output Messages (504)

After the source is defined, the severity levels are assigned and the destination is properly specified, output statements may be inserted in appropriate places in the program code. For the sake of explanation, the output methods may be logically categorized into three groups: (1) typical message output with severity; (2) output denoting the flow of a program; and (3) master gate.

(1) Typical Message Output With Severity: Table 1 illustrates the format for a typical output message with severity, where the designated severity level is masked with "xxxx." The "T" designates a typical message output.

TABLE 1

| Location | Category |
| --- | --- |
| xxxxT(String message) | xxxxT(Location loc, String message) |
| xxxxT(String subloc, String message) | xxxxT(Location loc, String subloc, String message) |
| xxxxT(String message, Object[ ] args) | xxxxT(Location loc, String message, Object[ ] args) |
| xxxxT(String subloc, String message, Object[ ] args) | xxxxT(Location loc, String subloc, String message, Object[ ] args) |

A pattern exists in method overloading which evolves around the core argument: message. The addition of subloc, args offers the flexibility for developers to log messages using the level of detail that they need. Understanding these arguments helps when selecting the heavily overloaded methods.

One difference in the API between Location and Category is an additional loc argument in Category output methods. As described above, log messages are typically written with respect to a source code area. This proves to be very helpful for logging analysis. By specifying the loc argument, a programmer may indicate that the message should be written as a trace message associated with the loc object. By properly configuring loc, logging can be just performed once and piped for both message types (e.g., logs & traces) simultaneously. This technique works for Location as well, and the API is available to specify the category argument. These techniques are explained in more detail below (section entitled "Relationship Between location and Category).

The subloc argument is treated as the method name of the source class that the message is generated from. This is optional, but with this argument included in the trace/log, the picture when doing analysis will be much clearer, for example, because different arguments can be specified for overloaded methods). The actual message to be output is placed in the argument message. A designation may be selected that meaningfully describes the situation/problem.

An array of additional arguments that are informative, e.g. dynamic information may be included in the message. In one embodiment, this is achieved by using java.text.MessageFormat API to resolve arguments.

Referring again to the code example set forth above, the following is an example working from the object Location:

```
package com.sap.fooPackage;
import com.sap.tc.logging.*;
public class Node {
    private static final Location loc =
    Location.getLocation("com.sap.fooPackage.Node");
    public void announce(Object o) {
        String method = "announce(java.lang.Object)";
        try {
            // do something ... eg. connecting to DB, perform
    certain actions
            loc.debugT(method, "Connecting to ... .");
            //minor error in writing something
            loc.warningT(method,
                "Problems in row {0} to {1}",
                new Object[ ] {row1, rowN});
            //finish successfully
            loc.infoT(method, "DB action done successfully");
        }
        catch (Exception e) {
        }
    }   // method announce
}   // class Node
```

Potential output is as follows, assuming the human-readable formatter is used (e.g., to display on a console):

```
May 3, 2001 6:54:18 PM
com.sap.fooPackage.Node.announce [main] Debug:
Connecting to ... .
May 3, 2001 6:54:18 PM
com.sap.fooPackage.Node.announce [main] Warning:
Problems in row 15 to 18
May 3, 2001 6:54:18 PM com.sap.fooPackage.Node.announce
[main] Info: DB action done successfully
```

The following is another example, working from the object Category:

```
package com.sap.fooPackage;
import com.sap.tc.logging.*;
public class Node {
    private static final Location loc =
    Location.getLocation("com.sap.fooPackage.Node");
    private static final Category cat =
    Category.getCategory("/System/Database");
        public void store( ) {
            try {
                // Write object data to database ...
            }
            catch (FailedRegistrationException e) {
                cat.errorT(loc,
                    "store( )",
                    "Error storing node {0} in database.",
                    new Object[ ] {this});
            }
        }   // method store
}   // class Node
```

Note that the output will be identical to the previous example, assuming the default setting is used (e.g., using a human-readable formatter).

(2) Output Denoting the Flow of a Program: This feature is typically only used for Location sub-controllers. Tracing the flow of a program may be comprised of several components, for example: (a) entering, (b) exiting, (c) throwing, and (d) assertion.

(a) Entering: Outputs a default message (e.g., "Entering Method" with Path severity) indicating that it is entering a source block, as shown by Table 2:

TABLE 2

| Method | Description |
| --- | --- |
| Entering( ) | Entering a source block in general |
| Entering(String subloc) | Specify the method name in subloc |
| Entering(Object[ ] args) | A general source block with arguments: "Entering method with <args>" |
| Entering(String subloc, Object[ ] args) | Same as above but with specific method name |

(b) Exiting: Output is a default message (e.g., "Exiting Method" with Path severity) indicating that it is leaving a source block, as shown by Table 3:

TABLE 3

| Method | Description |
| --- | --- |
| Exiting( ) | Exiting a source block in general. As long as the methodname (subloc) is specified in 'entering', it is not necessary to provide subloc as argument here anymore. See the result of the following sample code. |
| Exiting(String subloc) //DEPRECATED | Specify the method name in subloc |
| Exiting(Object res) | A general source block with result: "Exiting method with <res>" |
| Exiting(String subloc, Object res) | Same as above but with specific method name |

To reiterate, refer to the sample code with method announce(Object o):

```
public void announce (Object o) {
    String method = "announce (java.lang.Object)";
    loc.entering (method);
    try {
    }
    catch (Exception e) {
    }
    loc.exiting ( );
}
```

Potential output, assuming the simplest case with ConsoleLog and default TraceFormatter:

```
May 3, 2001 6:54:18 PM
com.sap.fooPackage.Node.announce [main] Path: Entering
method
    May 3, 2001 6:54:18 PM
```

-continued

> com.sap.fooPackage.Node.announce [main] Path: Exiting method (c) Throwing: Warning message ("Throwing . . . "), indicating that the source block is about to throw an exception, as shown by Table 4:

TABLE 4

| Method | Description |
| --- | --- |
| throwing(Throwable exc) | About to throw the exception exc |
| Throwing(String subloc, Throwable exc) | Same as above but with specific method name |

(d) Assertion: used to test a condition and output an error message, normally with the assertion included (e.g., "Assertion failed: <assertion test>") when the evaluation is false, as shown by Table 5:

TABLE 5

| Method | Description |
| --- | --- |
| Assertion(Boolean assertion, String desc) | Evaluate the assertion, if false, print desc with the default message: "Assertion failed: <desc>" where <desc> is the assertion test itself, e.g. 5 > 3 |
| Assertion(String subloc, Boolean assertion, String desc) | Same as above but with specific method name |

To reiterate, refer to the sample code with method announce(Object o):

```
public void announce (Object o) {
String method = "announce (java.lang.Object)";
loc.assertion (method, 5 < 3,    "Stupid comparison");
try {
     }
catch (Exception e) {
    loc.throwing (method, e);
    }
}
```

The following is the potential output, again assuming a human-readable log formatter:

> May 3, 2001 6:54:18 PM
> com.sap.fooPackage.Node.announce [main]
> Error: Assertion failed: Stupid comparison
>     May 3, 2001 6:54:18 PM
> com.sap.fooPackage.Node.announce [main]
> Warning: Throwing java.io.FileNotFoundException:
>     C:\Not__Exist\zzzzz.log (The system cannot find the path specified)

(3) Master Gate: In one embodiment, all of the other output methods (with severity) are ultimately routed through a method, referred to herein as LogT, to actually perform any logging/tracing.

Location: These are similar to the first type of method, xxxxxT( ), but only with an additional severity argument at the beginning:

```
logT(int severity, String message)
logT(int severity, String subloc, String message)
logT(int severity, String message, Object [ ] args)
    logT(int severity, String subloc, String message,
        Object [ ] args)
```

Category: (Similar scenario to Location):

```
logT(int severity, Location loc, String message)
logT(int severity, Location loc, String subloc, String
message)
logT(int severity, Location loc, String message,
Object [ ] args)
logT(int severity, Location loc, String subloc, String
message,
Object [ ] args)
```

Grouping Related Log/Trace Messages

Often, it is useful to put several related messages together into one context. A typical example would be all trace messages stemming from one method call. In case of a database log, another example would be the messages representing the different database operations together forming one logical transaction. A formatter or log viewer can utilize this context information to visualize relations using, for example, indentation or tree controls. Groups are one mechanism to express such context information.

In one embodiment, a group is established via a call to openGroup. This call is based on the same conditions as output calls, that is, the group is opened depending on a severity and optional categories. After generating output the group is ended via a call to closeGroup. Note that there should be a balancing call of closeGroup for any call of openGroup. Even if an openGroup call did not open the group, closeGroup is matched with the call to openGroup. In case of success, in between the two calls, all output calls are assigned to the group. Messages may even be generated with the same condition as the group via the groupT and group output calls. These calls are also used to emit the opening and closing messages of a group, which are the first such messages emitted after the openGroup and closeGroup calls, respectively.

In the above method, for example, the following piece of code could be written. The message right after the openGroup call is the opening message of the group, the message after closeGroup is its closing message. Note that the groupT calls do not need a severity, a location or a method name, as these are fetched from the active group.

```
cat.openGroup (Severity.INFO,
            loc,
            method);
cat.groupT("Start storing tree with root {0}. ",
        new Object[ ] {this});
...
cat.groupT("Storing subnode {0}.",
        new Object [ ] {node});
...
cat.closeGroup( );
cat.groupT("Finished storing tree.");
```

Establishing Relationships Between Category & Location

It is a common practice to look at log messages and trace messages together when performing a diagnosis. A correlation between a problematic logical area and the source code location that generates the problem is highly desirable. For example, if an error occurs when closing the database, the actual location of the source code (from which class, which method, with what argument(s)) is reported as well.

An embodiment of the invention simplifies the generation of both log and trace messages in parallel, with the use of category and location. This will be illustrated with the following example. For simplicity, the example only shows the attachment of a location to a category (as used herein, a location associated with the category is referred to as a "relative" of the category). However, the same general principles apply to the attachment of a category to a location.

More than one category may be associated with a location at each logging. However, in one embodiment, only one location is assigned for one category. Refer to the output method APIs of each class:

```
Package com.sap.fooPackage;
import com.sap.tc.logging.*;
public class Node {
    private static final Location loc =
    Location.getLocation( "com.sap.fooPackage.Node");
        private static final Category objMgmt =
    Category.getCategory( "/Objects/Management".);
        public void announce(Object o) {
            final String method =
    "announce(java.lang.Object)";
            loc.entering(method, new Object[ ] {o});
            try {
                // Register object . . .
            }
            catch (RegistrationException e) {
                objMgmt.errorT (loc,
                    method,
                    "Error registering object {0}.",
                    new Object [ ] {o});
            }
            loc.exiting( );
        } // method announce
} // class Node
```

In order to output all the trace and log messages highlighted in the example above, the following severity setting may be employed:

```
lo.setEffectiveSeverity(Severity.PATH);
objMgmt.setEffectiveSeverity(Severity.ERROR);
conLog = new ConsoleLog ( );
loc.addLog (conLog);
objMgmt.addLog (conLog);
```

With respect to the output line from the category 'objMgmt', it will output two messages simultaneously: one log message and one trace message. They will have the same message id for cross-referencing each other. This greatly simplifies the analysis.

If the location has stricter severity setting (e.g. default Severity.NONE) all trace output may be suppressed, including the one from the category. In other words, that output line will NOT produce two messages simultaneously, but only the log message.

More advanced configuration may be employed regarding the correlated category and location source objects. For example, consider Category "/Objects/Management" where the only focus may be some extreme situations, that is, messages with severity FATAL. Several source code locations ('com.sapmarkets.xxx.a', 'com.sapmarkets.xxx.b', . . . ) can result in a fatal condition in this logical area, and for certain reasons, one of them may be of particular interest (e.g. 'com.sapmarkets.xxx.a'). As such, it would beneficial to have the ability to generate additional output messages, including all with severity INFO or above, related with this location only, while maintaining FATAL for the rest.

Configuring a Formatter

Referring again to FIG. 2, formatters (e.g., formatters 230, 231, and 232) may be used to format a trace/log message. In an embodiment, the formatter (e.g., formatter 231) may be configured to provide a desired message format. For example, in an embodiment, the log/trace message format provided by a formatter is defined by one or more properties in a configuration file. In such an embodiment, the message format may be configured by providing/removing/altering values for the properties defined in the configuration file. Since the values may be provided/removed/altered during runtime, a formatter may be configured without recompiling any source code.

FIG. 7a illustrates selected elements of an exemplary configuration file 700, according to an embodiment of the invention. In the illustrated embodiment, properties are defined with one or more key-value-pairs. Key-value-pairs may have the following format:

```
<location>.attribute  = value; and
<category>.attribute  = value.
```

For example, configuration file 700 includes key-value-pairs 710 and 720. Key-value-pair 710 defines a severity level for location 712 (e.g., com.sapmarkets.usermanagement) by setting attribute 714 equal to value 716 (e.g., WARNING). Key-value-pair 720, defines an output destination for location 712 by setting attribute 722 to output destination 724. In an alternative embodiment of the invention, configuration file 700 uses a format different than the key-value-pair format. In an embodiment, a particular type of formatter is, by default, assigned to a given output destination. For example, a trace formatter may be assigned to a console and list formatter may be assigned to a file log, by default. As is further described below, with reference to FIG. 8, the default formatter may be replaced with a different formatter by setting a value in, for example, configuration file 700.

FIG. 7b illustrates a default log/trace message format as defined by configuration file 700. In an embodiment, a formatter initially provides log/trace messages according to the default message format. As is further described below, with reference to FIG. 8, the default message format may be replaced by defining a particular message format in a configuration file. In one embodiment, the default message format is defined by a string of placeholders (and associated values) such as:

"%24d %-40l[% t] % s: % m."

Each placeholder (and associated value) may define a field in the message format. In such an embodiment, the string shown above may correspond to an output such as:

"Jan 01, 2001 10:10:00 PM com.sapmarkets.FooClass.fooMethod [main] Fatal: A sample fatal message."

Table 6 provides a description of selected placeholders according to an embodiment of the invention.

TABLE 6

| Placeholder | Description |
| --- | --- |
| % d | timestamp in readable form |
| % l | the location of origin (eg: com.sapmarkets.FooClass.fooMethod) |
| % c | the log controller the message was issued through (eg: com.sapmarkets.FooClass) |
| % t | the thread that emitted the message |
| % s | the message severity |
| % m | the formatted message text |
| % I | the message id |
| % p | the time stamp in milliseconds since Jan. 1, 1970 00:00:00 GMT |
| % g | the group identification |

In an embodiment, a configuration file may be used to, for example, change the default formatter assignment and/or the default message format. FIG. 8 illustrates selected elements of an exemplary configuration file 800, according to an embodiment of the invention in which the message format is configurable. In the embodiment illustrated in FIG. 8, the message format may be configured without recompiling any source code because the integrated logging/tracing system accesses configuration file 800 to determine the value of defined properties such as the format of a log/trace message.

Key-value-pair 805 assigns severity level 815 to source 810. In addition, key-value-pair 820 assigns two output destination destinations to source 810: console 825 and log file 830. Formatter 840 is assigned to console 825 by key-value-pair 835. In an embodiment, an identifier may be assigned to a formatter to uniquely (within the configuration file) identify the formatter. In the illustrated embodiment, key-value-pair 835 also provides identifier 845 (e.g., TraceNoDate) to identify formatter 840.

In an embodiment, defining a desired message format is accomplished by setting an attribute (e.g., a pattern attribute) for a formatter in configuration file 800. Key-value-pair 850 illustrates setting pattern attribute 855 to value 860 for formatter 840. In the illustrated embodiment, value 860 is a string of placeholders and associated values (e.g., placeholders/values 861-864) that define, for example, a log/trace message having four fields. As identifier 845 (e.g., TraceNoDate) suggests, value 860 defines a message format that does not include a timestamp.

In an embodiment, value 860 may (or may not) include any of the fields defined by the placeholders (and related values) specified in Table 6. Similarly, in an embodiment additional and/or different fields may be defined by additional and/or different placeholders (and associated values). In an alternative embodiment of the invention, the fields of a trace/log message may be specified by a value that has format different than the placeholder format shown in FIGS. 7-8.

Figure 9:
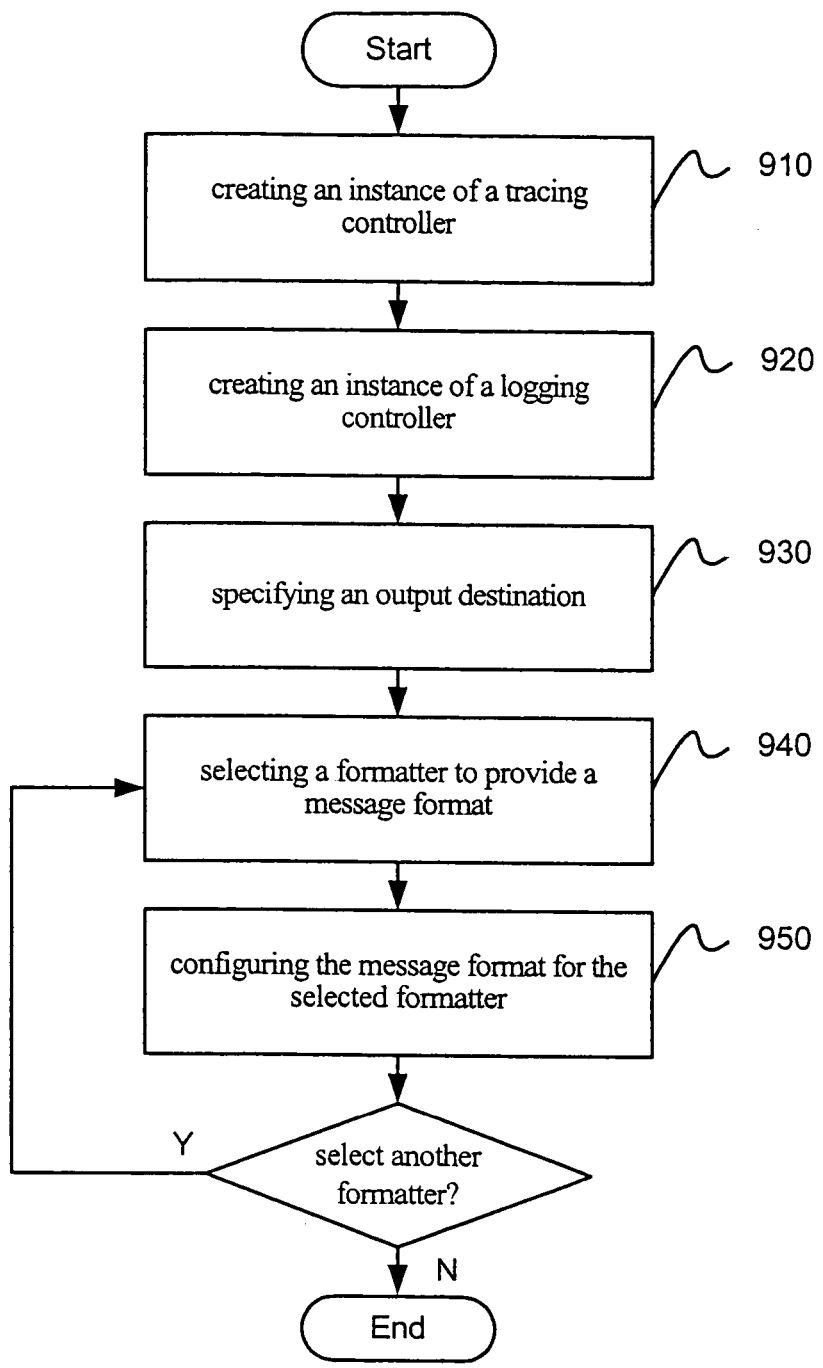
FIG. 9 is a flow diagram illustrating certain aspects of a method for configuring the message format of a log/trace message, according to an embodiment of the invention.

Turning now to FIG. 9, the particular methods associated with embodiments of the invention are described in terms of computer software and hardware with reference to a flowchart. The methods to be performed by a unified logging service with a logging formatter may constitute state machines or computer programs made up of computer-executable instructions. Describing the methods by reference to a flowchart enables one of ordinary skill in the art to develop such programs including such instructions to carry out the methods on suitably configured computing devices (e.g., one or more processors of a node) executing the instructions from computer-accessible media. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement the teachings of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

FIG. 9 is a flow diagram illustrating certain aspects of a method for configuring the message format of a log/trace message, according to an embodiment of the invention. Referring to process block 910, an instance of a tracing controller associated with specified program code regions of an application is created. In an embodiment, the tracing controller instance receives and processes tracing method calls generated by the application when the specified program code regions are executed. In an embodiment, a threshold severity level for tracing method calls may be defined by a value in a configuration file (e.g., configuration file 800, shown in FIG. 8). Tracing method calls having a severity level below this threshold may not be processed.

Referring to process block 920, an instance of a logging controller associated with specified categories related to a network is created. In an embodiment, the logging controller instance receives and processes logging method calls from network components associated with the categories. In an embodiment, a threshold severity level for logging method calls may be defined by a value in a configuration file (e.g., configuration file 800, shown in FIG. 8). Logging method calls having a severity level below this threshold may not be processed.

Referring to process block 930, an output destination to receive log/trace messages is specified. In an embodiment, the output destination may receive log/trace messages from the tracing controller instance and/or the logging controller instance. In an embodiment, the output destination for a tracing controller instance and/or a logging controller instance may be defined by a value in a configuration file. In such an embodiment, specifying the output destination broadly refers to providing/setting/changing a value representing the output destination in the configuration file. In one embodiment, the possible output destinations include a console and/or a file log.

Referring to process block 940, a formatter to provide a message format for log/trace messages is selected. In an embodiment, one or more distinct formatters may be selected for each source (e.g., for each logging controller instance and/or each tracing controller instance). The relationship between a source and a formatter may be defined in a configuration file (e.g., configuration file 800, shown in FIG. 8). In such an embodiment, selecting the formatter broadly refers to providing/setting/changing a value representing the formatter in the configuration file. In one embodiment, the available formatter types include: a list formatter, a human-readable formatter, and/or a markup language formatter.

Referring to process block 950, the selected formatter is configured, for example, without recompiling any source code. In an embodiment, the message format provided by the selected formatter is defined by one or more properties in a configuration file. For example, the message format may be defined to have one or more fields that are specified by a string of placeholders (and associated values). In such an embodiment, configuring the formatter may include configuring the message format by providing/setting/changing the values of the properties defined in the configuration file. In one embodiment, configuring the formatter may also include providing/setting/changing an identifier to uniquely identify (within the configuration file) the formatter.

Log Viewer

In an embodiment, the integrated logging and tracing system includes a log viewer to access, display, and process log/trace messages (or simply, log messages). In one embodiment, the log viewer provides access to log messages that are distributed on one or more application servers (e.g., one or more J2EE application servers). For example, the log viewer may facilitate searching and displaying log messages from one or more application servers on a single Graphical User Interface (GUI). As is further described below, the log viewer provides an interface to configure one or more output destinations, in an embodiment of the invention.

Figure 10:
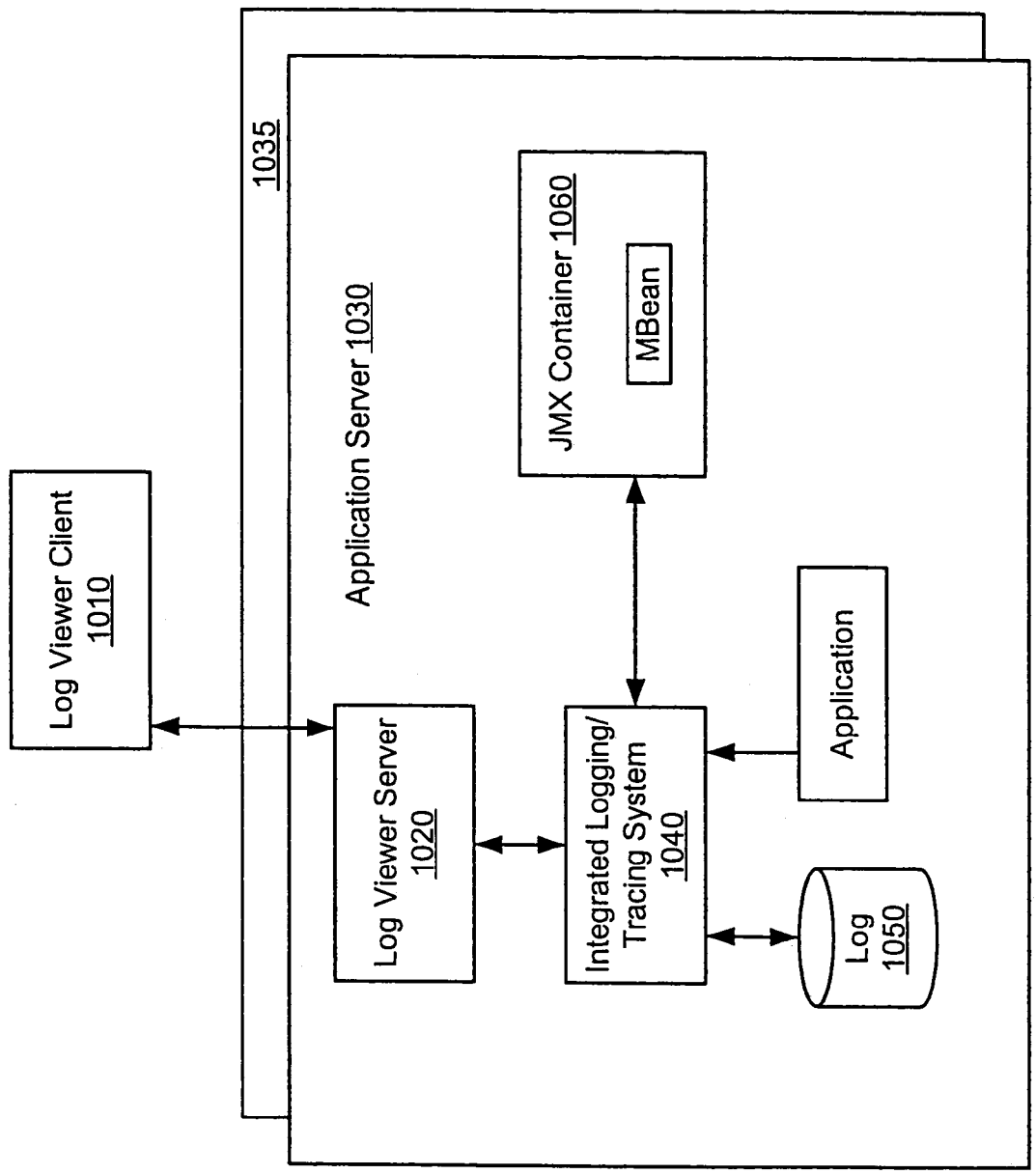
FIG. 10 illustrates the architecture of a log viewer, according to an embodiment of the invention.

FIG. 10 illustrates the architecture of a log viewer, according to an embodiment of the invention. In an embodiment, the log viewer includes log viewer client 1010 and log viewer server 1020. Log viewer client 1010 may provide an interface to the integrated logging and tracing system. In one embodiment, log viewer client 1010 provides a Graphical User Interface (GUI) to selected elements of the integrated logging and tracing system. In an alternative embodiment, log viewer client 1010 provides a command-line interface to the integrated logging and tracing system. In yet another alternative embodiment, log viewer client 1010 provides both a GUI and a command-line interface to the integrated logging and tracing system.

In embodiments of the invention in which log viewer client 1010 provides a GUI, the provided GUI may be a "Swing-based" GUI. A Swing-based GUI refers to a GUI that is based on the Swing API provided by any of the Java 2 Enterprise Edition Specifications, for example, v1.3, published on Jul. 27, 2001 (hereinafter the J2EE Standard). In an alternative embodiment of the invention, log viewer client 1010 may be based on a different API.

In an embodiment, log viewer server 1020 may reside on application server 1030 and/or application server 1035. While log viewer server 1020 is described with reference to application server 1030, the principles described may also apply to instances of log viewer server 1020 that are implemented on other application servers within the network (e.g., application server 1035). Log viewer server 1020 may access integrated logging/tracing system 1040 to read log messages and provide those log messages to log viewer client 1010.

In one embodiment, log viewer client 1010 receives commands from an end-user and provides those commands to log viewer server 1020. Log viewer server 1020 may access integrated logging/tracing system 1040 to, for example, read log messages, and may then send the results back to log viewer client 1010. In one embodiment, log messages and output destinations are implemented as objects. In such an embodiment, log viewer server 1020 may query, for example, output destination 1050 with a LogQuery object and return the result to log viewer client 1010 with a LogQueryResutSet object.

In the illustrated embodiment, output destination 1050 is implemented as a management bean (or simply, MBean). An MBean is a Java object that represents a manageable resource, such as an application, a service, a component, or a device. An Mbean provides a management interface that consists of attributes and operations that are exposed for management purposes. An MBean may be implemented according to, for example, an emerging standard called, JSR-000003 Java Management eXtensions (JMX), version 1.2 (hereinafter, the JMX Specification). The JMX Specification provides a standardized way to manage arbitrary Java resources in enterprise computer networks.

In such an embodiment, integrated logging/tracing system 1040 may utilize the services provided by JMX container 1060. The term "container" broadly refers to an entity that provides services to another entity. The services provided by a container may include, for example, lifecycle management, security, connectivity, transactions, and/or persistence. In an embodiment, JMX container 1060 provides services to access and process one or more output destinations (e.g., output destination 1050) that are implemented as Mbeans.

Figure 11:
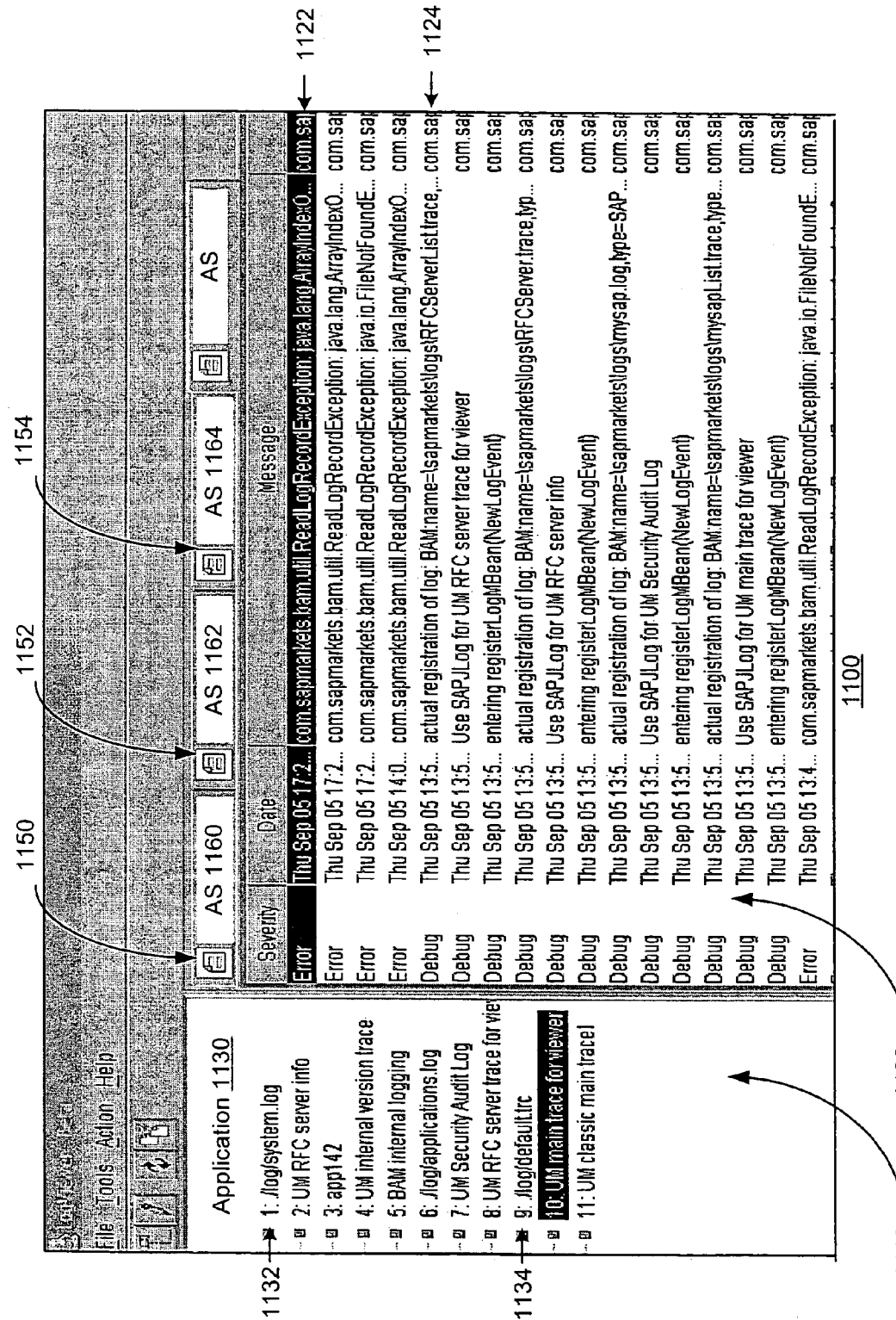
FIG. 11 illustrates an exemplary Graphical User Interface (GUI) 100 provided by a log viewer client (e.g., log viewer client 1010, shown in FIG. 10), according to an embodiment of the invention.

FIG. 11 illustrates an exemplary GUI 1100 provided by a log viewer client (e.g., log viewer client 1010, shown in FIG. 10), according to an embodiment of the invention. GUI 1100 includes panes 1110 and 1120. The term "pane" broadly refers to a sub-section of a window. The term "window" refers to a scrollable viewing area on a screen. Typically panes and windows are rectangular in shape but they are not required to be rectangular.

Pane 1110 displays selected elements of application 1130. Application 1130 includes one or more program code regions that may generate log messages when the program code regions are executed. For example program code region 1132 may be associated with a logging module and may generate log messages for an output destination of the logging module. Similarly, program code region 1134 may be associated with a tracing module and may generate log messages for an output destination of the tracing module.

Pane 1120 displays a number of exemplary log messages (e.g., log messages 1122 and 1124) generated by application 1130. Each log message may include one or more fields to display one or more corresponding items of information. For example, the illustrated embodiment includes a severity field, a timestamp field, and a message field. In an alternative embodiment of the invention, pane 1120 may display more fields, fewer fields, and/or different fields.

In an embodiment, GUI 1100 displays log messages from more than one application server. For example, pane 1120 displays log messages from a first application server. Similarly, tabs 1150, 1152, and 1154 may each be attached to panes that display log messages from application servers 1160, 1162, and 1164, respectively. An end-user may view log messages from application servers 1160, 1162, and 1164 by selecting tabs, 1150, 1152, and 1154, respectively.

Figure 12:
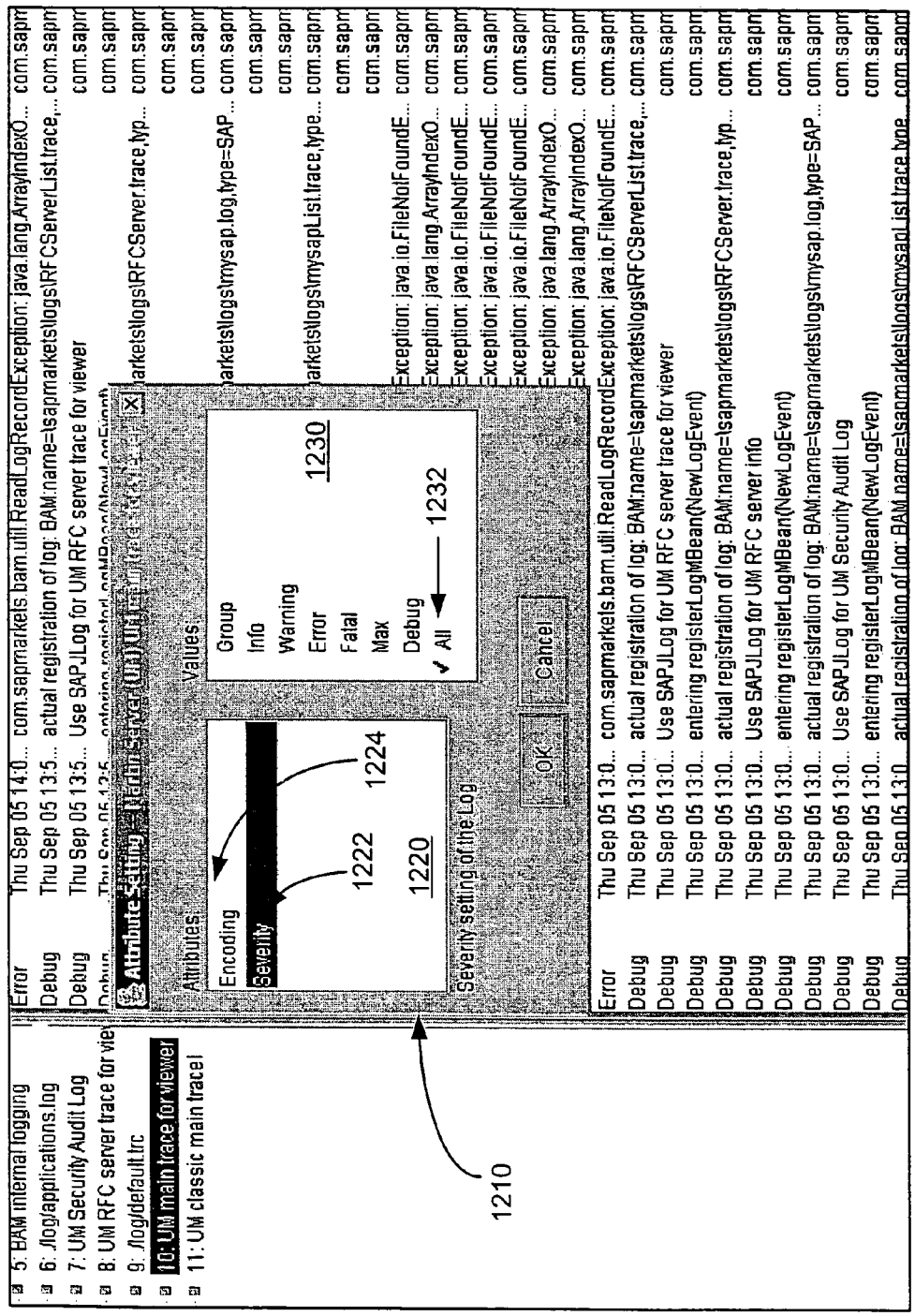
FIG. 12 illustrates an exemplary GUI 1200 for setting an attribute of an output destination, according to an embodiment of the invention.

In an embodiment, a log viewer client (e.g., log viewer client 1010, shown in FIG. 10) provides an interface to set an attribute of an output destination (e.g., output destination 1050, shown in FIG. 10). Setting an attribute may include, for example, setting a severity level of an output destination and/or providing a filter for an output destination. FIG. 12 illustrates an exemplary GUI 1200 for setting an attribute of an output destination, according to an embodiment of the invention.

GUI 1200 includes dialog window 1210. The term "dialog window" broadly refers to a window that provides an end-user with status information and available options for a particular feature of an application. Dialog window 1210 includes attribute pane 1220 and value pane 1230. Attribute pane 1220 allows an end-user to select one of attributes 1222 and 1224. Value pane 1230 displays a current value for the selected attribute and allows an end-user to set the value to one of a number of displayed potential values.

In the illustrated embodiment severity attribute 1222 is selected in attribute pane 1220. The current value assigned to severity attribute 1222 is ALL value 1232. In an embodiment, an end-user may set the value of severity attribute 1222 to any of the values displayed in value pane 1230.

Figure 13A:
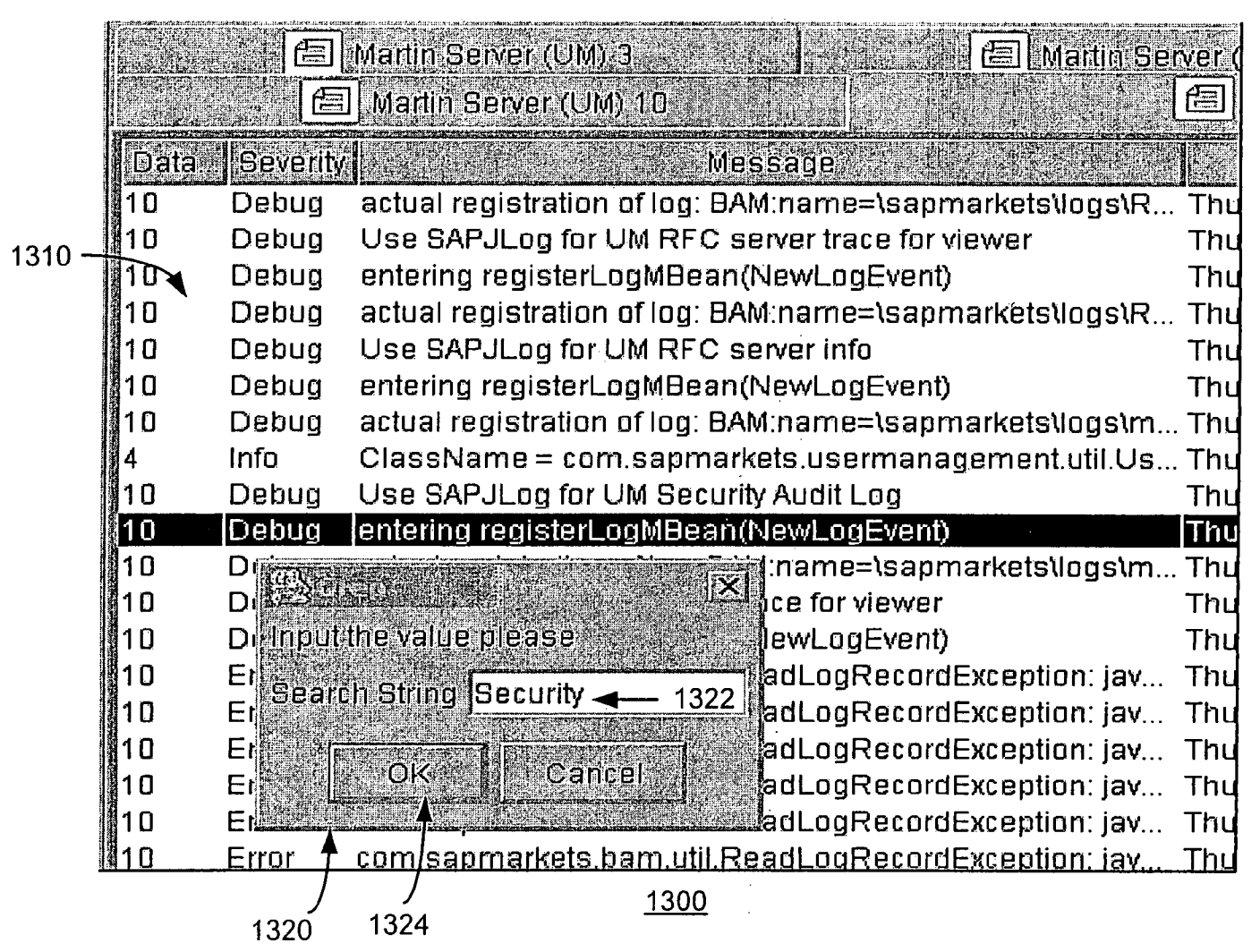

FIG. 13a illustrates an exemplary GUI 1300 for conducting searches of log messages, according to an embodiment of the invention. GUI 1300 includes pane 1310 and dialog window 1320. Pane 1310 displays a number of log messages from one or more application servers. Dialog window 1320 allows an end-user to enter a value for search string 1322. After entering a value for search string 1322 (e.g., "security"), the end-user may depress "okay" button 1324 to start the search. In an embodiment, the resolution of the search may be set to, for example, a single column of pane 1310, multiple columns of pane 1310, all log messages from a particular application, all log messages from a given application server, and/or all log messages generated within the integrated logging/tracing system.

Figure 13B:
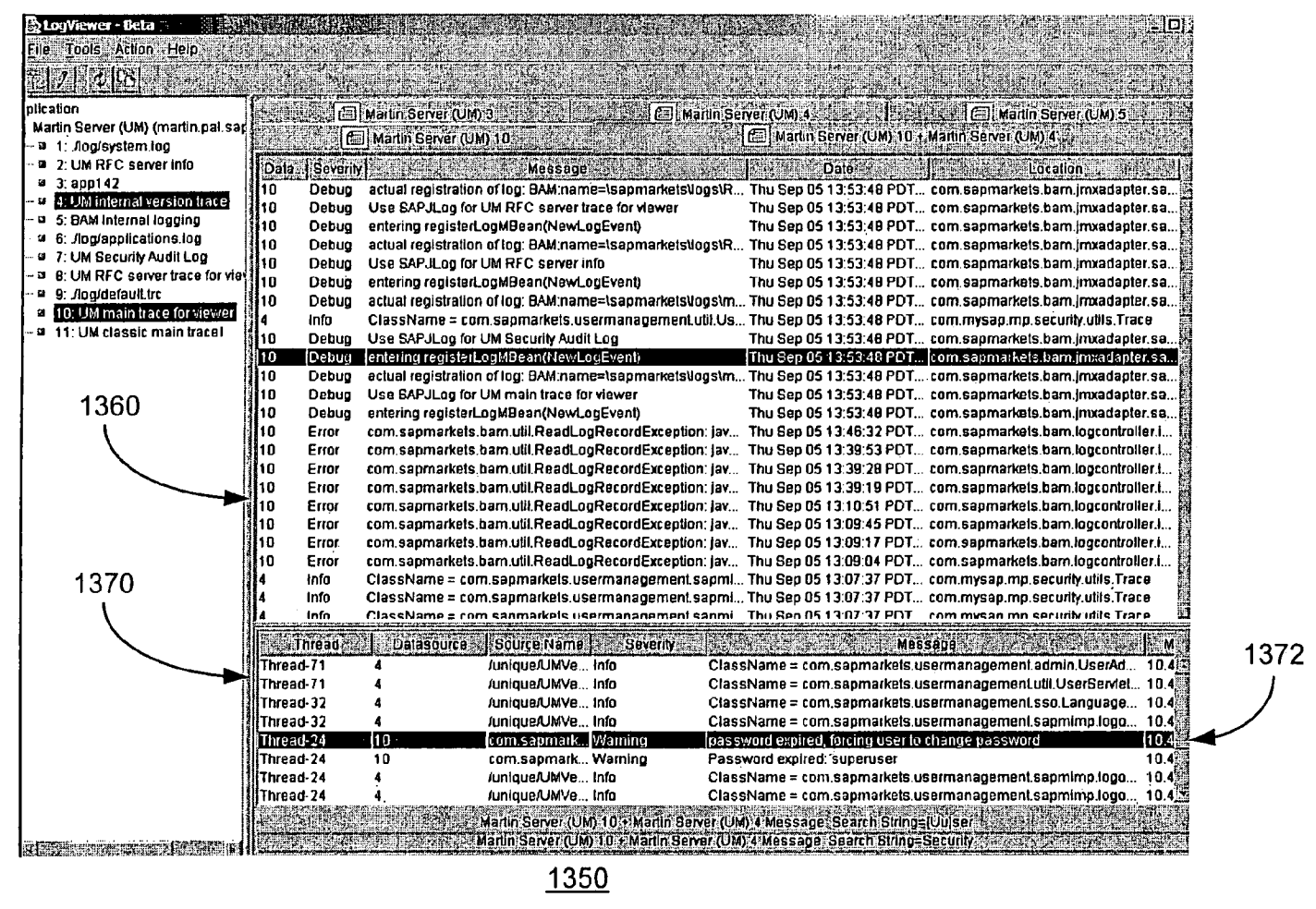

FIG. 13b illustrates an exemplary GUI 1350 for displaying search results for searches conducted according to an embodiment of the invention. In an embodiment, GUI 1350 includes log messages pane 1360 and search results pane 1370. Log messages pane 1360 displays a set of log messages that may be searched to determine whether they contain a specified search string (e.g., search string 1322, shown in FIG. 13a). Search results pane 1370 displays one or more log messages that contain the specified search string. In an embodiment, an end-user may scroll through search results pane 1370 and select a particular log message (e.g., selected log message 1372) for further inspection.

Figure 14:
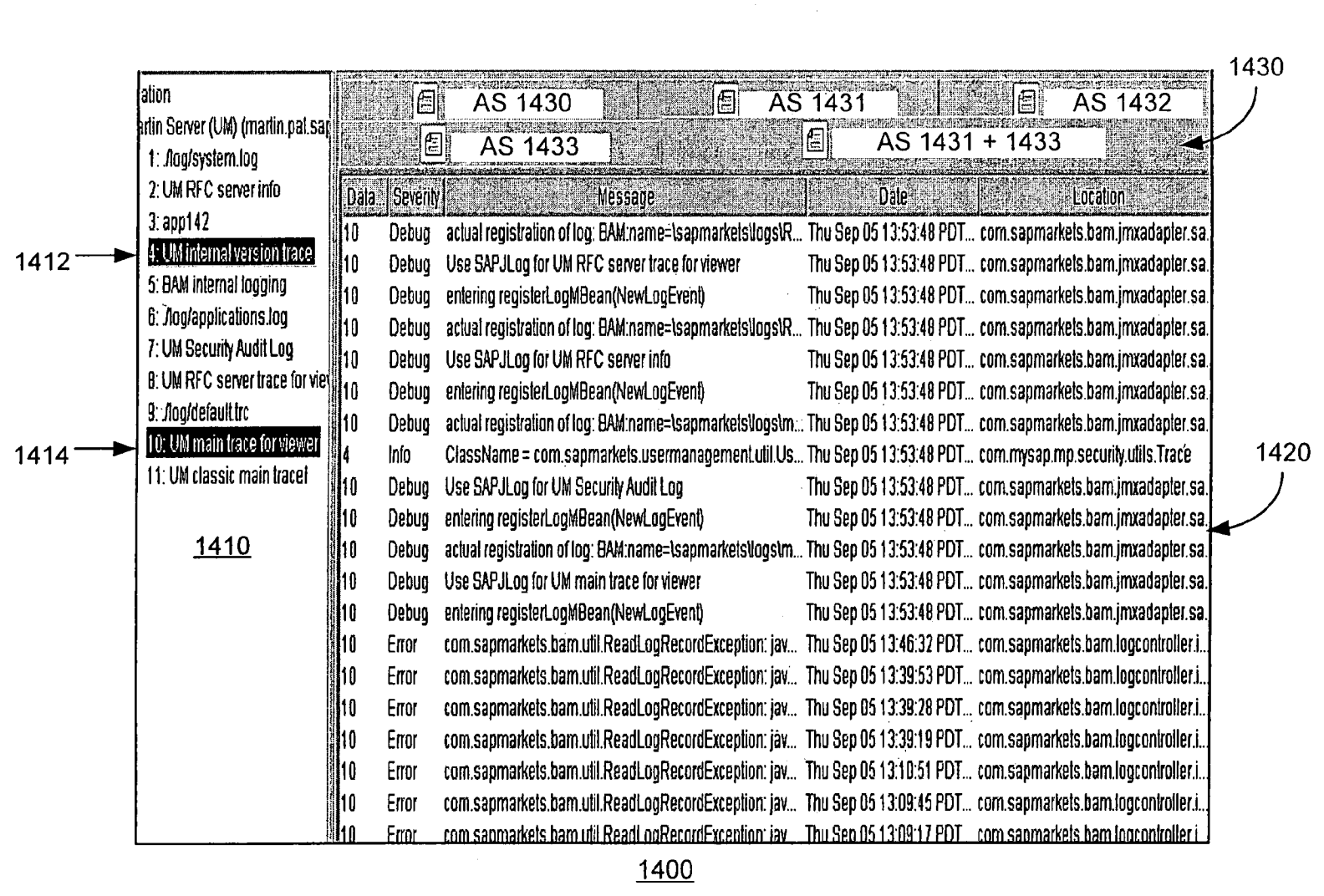

In an embodiment, log messages from two or more output destinations (and/or two or more application servers) may be merged into a single display. FIG. 14 illustrates an exemplary GUI 1400 for merging log messages, according to an embodiment of the invention. GUI 1400 includes specified program code regions pane 1410, displayed log messages pane 1420, and server tabs 1430-33.

Specified program code regions pane 1410 includes program code regions 1412 and 1414. In an embodiment, program code regions 1412 and 1414 are each associated with an output destination to store log messages that are generated when program code regions 1412 and 1414 are executed. In the illustrated embodiment, program code regions 1412 and 1414 are both selected, for example, via a pointing device. In an embodiment, GUI 1400 merges the log messages from the selected output destinations. In addition, GUI 1400 may sort the merged log messages (e.g., in descending order of time, according to their respective timestamps). The log messages stored in their respective output destinations are merged and displayed in log messages pane 1420.

In an embodiment, log messages generated in two or more application servers may be merged and displayed in log messages pane 1420. For example, in an embodiment, server tabs 1431 and 1433 are attached to panes that respectively display log messages from two different application servers. An end-user may specify (e.g., via a pointing device) that the log messages displayed in the panes attached to tabs 1431 and 1433 be merged into a single display. Tab 1430 provides access to a pane that displays the merged log records.

Figure 15:
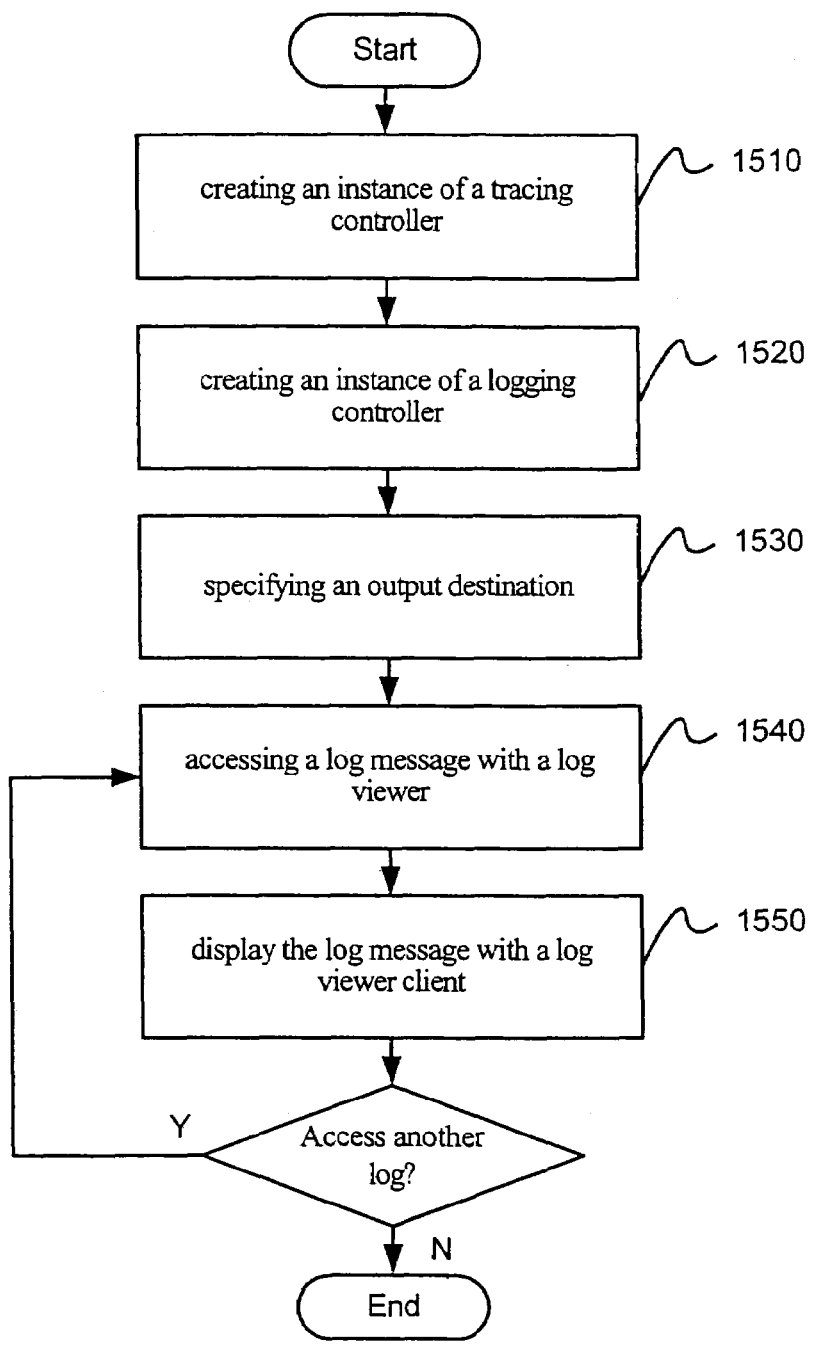
FIG. 15 is a flow diagram illustrating certain aspects of a method for displaying and processing log messages, according to an embodiment of the invention.

FIG. 15 is a flow diagram illustrating certain aspects of a method for displaying and processing log messages, according to an embodiment of the invention. Referring to process block 1510, an instance of a tracing controller associated with specified program code regions of an application is created. In an embodiment, the tracing controller instance receives and processes tracing method calls generated by the application when the specified program code regions are executed. In an embodiment, a threshold severity level for tracing method calls may be defined by a value in a configuration file (e.g., configuration file 800, shown in FIG. 8). Tracing method calls having a severity level below this threshold may not be processed.

Referring to process block 1520, an instance of a logging controller associated with specified categories related to a network is created. In an embodiment, the logging controller instance receives and processes logging method calls from network components associated with the categories. In an embodiment, a threshold severity level for logging method calls may be defined by a value in a configuration file (e.g., configuration file 800, shown in FIG. 8). Logging method calls having a severity level below this threshold may not be processed.

Referring to process block 1530, an output destination to receive log/trace messages is specified. In an embodiment, the output destination may receive log/trace messages from the tracing controller instance and/or the logging controller instance. In an embodiment, the output destination for a tracing controller instance and/or a logging controller instance may be defined by a value in a configuration file. In such an embodiment, specifying the output destination broadly refers to providing/setting/changing a value representing the output destination in the configuration file. In one embodiment, the possible output destinations include a console and/or a file log.

Referring to process block 1540, a log viewer accesses a log message generated by at least one of the tracing controller instance and the logging controller instance. In an embodiment the log viewer includes a log viewer client (e.g., log viewer client 1010, shown in FIG. 10) and a log viewer server (e.g., log viewer server 1020, shown in FIG. 10). In one embodiment, log messages are stored in output destinations that are implemented as Mbeans (e.g., according to the JMX Specification). In such an embodiment, accessing the log message may include accessing an MBean via the services provided by a JMX container (e.g., JMX container 1060, shown in FIG. 10).

Referring to process block 1550, the log viewer displays the accessed log message. In an embodiment, the log viewer client includes a GUI that is based on the Swing API. In such an embodiment, displaying the accessed log message includes displaying the log message in a window (or pane) of the Swing-based GUI. Displaying the accessed log message may include displaying log messages from more than one application server.

As is further described above with reference to FIGS. 11-14, the GUI may provide additional functionality for processing displayed log messages. For example, in an embodiment, an attribute of an output destination storing log messages may be set from the GUI. In one embodiment, the attributes of the output destination may be stored as properties in a configuration file. In such an embodiment, setting an attribute includes setting a value defining the attribute in the configuration file from the GUI.

Figure 16:
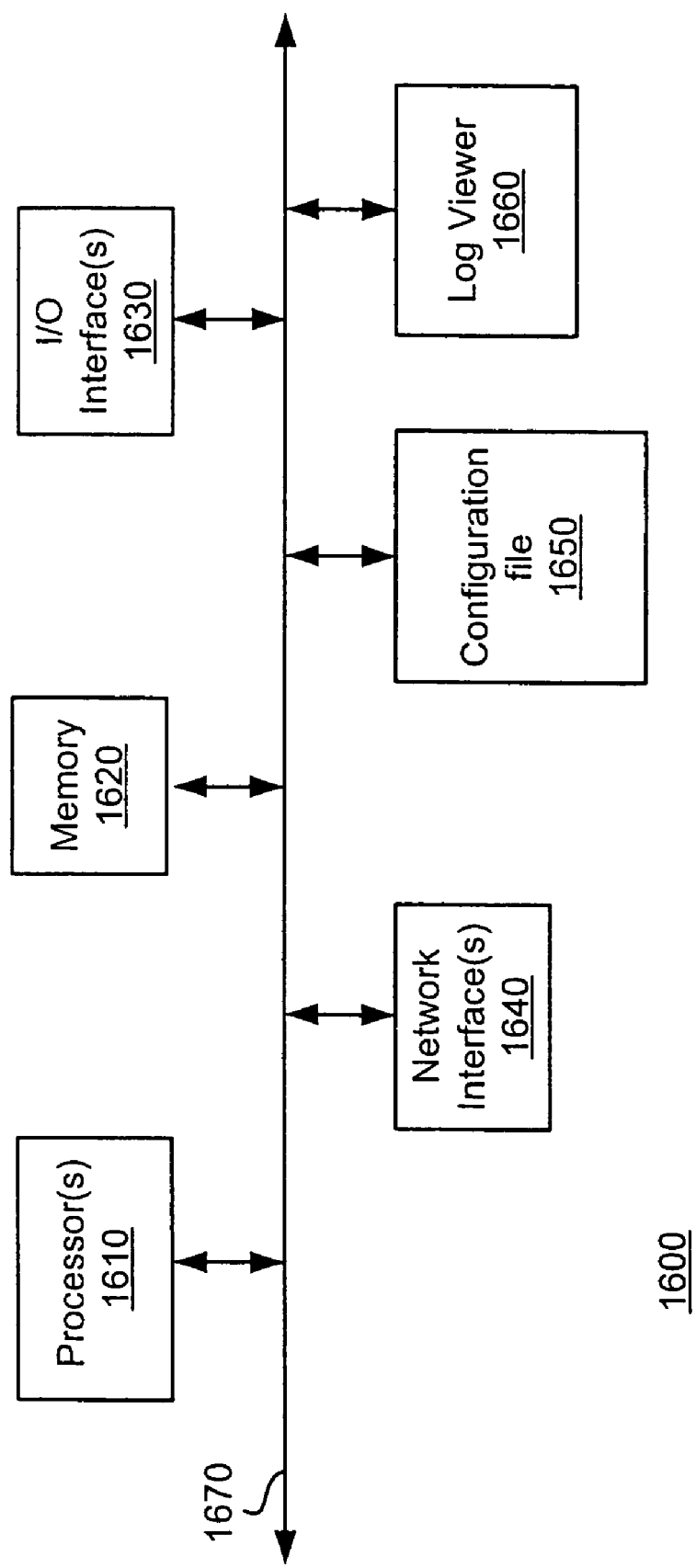
FIG. 16 is a block diagram of computing device 1600 implemented according to an embodiment of the invention.

FIG. 16 is a block diagram of computing device 1600 implemented according to an embodiment of the invention. Computing device 1600 may include: one or more processors 1610, memory 1620, one or more Input/Output (I/O) interfaces 1630, network interface(s) 1640, configuration file 1650, and log viewer 1660. The illustrated elements may be connected together through system interconnect 1670. One or more processors 1610 may include a microprocessor, microcontroller, field programmable gate array (FPGA), application specific integrated circuit (ASIC), central processing unit (CPU), programmable logic device (PLD), and similar devices that access instructions from system storage (e.g., memory 1620), decode them, and execute those instructions by performing arithmetic and logical operations.

Log viewer 1660 enables computing device 1600 to view and process log messages generated by an integrated logging and tracing architecture. Log viewer 1660 may be executable content, control logic (e.g., ASIC, PLD, FPGA, etc.), firmware, or some combination thereof, in an embodiment of the invention. In embodiments of the invention in which log viewer 1660 is executable content, it may be stored in memory 1620 and executed by processor(s) 1610.

Configuration file 1650 defines one or more properties for one or more configurable attributes of an integrated logging/tracing system. Configuration file 1650 may be executable content, control logic (e.g., ASIC, PLD, FPGA, etc.), firmware, or some combination thereof, in an embodiment of the invention. In embodiments of the invention in which configuration file 1650 is executable content, it may be stored in memory 1620 and manipulated by processor(s) 1610.

Memory 1620 may encompass a wide variety of memory devices including read-only memory (ROM), erasable programmable read-only memory (EPROM), electrically erasable programmable read-only memory (EEPROM), random access memory (RAM), non-volatile random access memory (NVRAM), cache memory, flash memory, and other memory devices. Memory 1620 may also include one or more hard disks, floppy disks, ZIP disks, compact disks (e.g., CD-ROM), digital versatile/video disks (DVD), magnetic random access memory (MRAM) devices, and other system-readable media that store instructions and/or data. Memory 1620 may store program modules such as routines, programs, objects, images, data structures, program data, and other program modules that perform particular tasks or implement particular abstract data types that facilitate system use.

One or more I/O interfaces 1630 may include a hard disk drive interface, a magnetic disk drive interface, an optical drive interface, a parallel port, serial controller or super I/O controller, serial port, universal serial bus (USB) port, a display device interface (e.g., video adapter), a network interface card (NIC), a sound card, modem, and the like. System interconnect 1670 permits communication between the various elements of computing device 1600. System interconnect 1670 may include a wide variety of signal lines including one or more of a memory bus, peripheral bus, local bus, host bus, bridge, optical, electrical, acoustical, and other propagated signal lines.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. An integrated tracing and logging system employed within a network comprising:
    a tracing module associated with a specified program code region of an application, the tracing module to receive and process tracing method calls generated by the application when the specified program code region is executed;
    a logging module associated with a specified category related to the network, the logging module to receive and process logging method calls from network components associated with the category;
    a common application programming interface (API) of the tracing module and the logging module to control both the tracing module and the logging module, the common API defining an relationship between the specified program code region and the category, wherein a single method call of an application to the common API generates, based on the defined relationship between the specified program code region and category, both a log message of the logging module and a trace message of the tracing module; and
    a log viewer module to provide access to the integrated tracing and logging system via the common application programming interface of the tracing module and the logging module.

2. The system of claim 1, wherein the log viewer module comprises:
    a log viewer client to provide a user interface; and
    a log viewer server to access a message in at least one of the tracing module and the logging module.

3. The system of claim 2, wherein providing a user interface includes providing a graphical user interface to access one or more messages generated by at least one of the tracing module and the logging module.

4. The system of claim 3, wherein providing a graphical user interface includes providing a first pane having one or more messages from a first application server and a second pane having one or messages from a second application server.

5. The system of claim 3, wherein the graphical user interface is to configure an output destination for the integrated tracing and logging system.

6. The system of claim 5, wherein the graphical user interface to configure an output destination comprises a dialog window to set an attribute of the output destination.

7. The system of claim 6, wherein the attribute of the output destination includes at least one of
    a severity level; and
    a filter.

8. The system of claim 3, wherein the one or more messages are implemented as management beans.

9. The system of claim 2, wherein the log viewer client is to provide a command line interface to access one or more messages generated by at least one of the tracing module and the logging module.

10. A computer-implemented method employed within a network comprising:
creating an instance of a tracing controller associated with a specified program code region of an application, the tracing controller instance to receive and process tracing method calls generated by the application when the specified program code region is executed;
creating an instance of a logging controller associated with a specified category related to the network, the logging controller to receive and process logging method calls from network components associated with the category;
providing a common application programming interface (API) of the tracing controller instance and the logging controller instance to control both the tracing controller instance and the logging controller instance ,the common API defining an relationship between the specified program code region and the category, receiving via the common API a single method call of an application, generating both a log message of the logging module and a trace message of the tracing module in response to the single method call, the generating based on the defined relationship between the specified program code region and the category;
specifying an output destination to receive via the common application programming interface of the tracing controller instance and the logging controller instance a message from at least one of the tracing controller instance and the logging controller instance; and
accessing the message with a log viewer, the log viewer having a log viewer server and a log viewer client.

11. The method of claim 10, wherein accessing the message comprises accessing a first message on a first application server, the method further comprising:
accessing a second message on a second application server; and
displaying the first message and the second message in a window of a graphical user interface of the log viewer client.

12. The method of claim 11, wherein displaying the first message and the second message in the window of the graphical user interface of the log viewer client comprises:
displaying the first message in a first pane of the window; and
displaying the second message in a second pane of the window.

13. The method of claim 11, further comprising:
selecting the first message in the first pane of the window;
selecting the second message in the second pane of the window;
merging the first message and the second message; and
displaying the first message and the second message in a third pane of the window.

14. The method of claim 11, wherein displaying the first message and the second message in a window of a graphical user interface of the log viewer client further comprises:
displaying one or more messages of the output destination in the window of the graphical user interface of the log viewer client.

15. The method of claim 14, further comprising:
searching the one or more displayed messages to determine which, if any, of the displayed messages contain a search string.

16. The method of claim 15, further comprising:
identifying at least one of the one more displayed messages having the search string;
creating a search results pane in the window of the graphical user interface; and
displaying the identified message in the search results pane.

17. The method of claim 10, further comprising:
displaying a representation of the output destination in the log viewer;
selecting the displayed representation of the output destination;
opening a dialog window to access an attribute of the displayed representation of the output destination; and
setting an attribute of the selected output destination with the opened dialog window.

18. The method of claim 17, wherein setting the attribute of the selected output destination comprises:
setting a severity level of the output destination.

19. The method of claim 17, wherein setting the attribute of the selected output destination comprises:
specifying a filter for the output destination.

20. A system comprising:
a means for creating an instance of a tracing controller associated with a specified program code region of an application, the tracing controller instance to receive and process tracing method calls generated by the application when the specified program code region is executed;
a means for creating an instance of a logging controller associated with a specified category related to the network, the logging controller to receive and process logging method calls from network components associated with the category;
a common application programming interface (API) of the tracing controller instance and the logging controller instance to control both the tracing controller instance and the logging controller instance, the common API defining an relationship between the specified program code region and the category, wherein a single method call of an application to the common API generates, based on the defined relationship between the specified program code region and the category, both a log message of the logging module and a trace message of the tracing module;
a means for specifying an output destination to receive via the common application programming interface of the tracing controller instance and the logging controller instance a message from at least one of the tracing controller instance and the logging controller instance; and
a means for accessing the message with a log viewer, the log viewer having a log viewer server and a log viewer client.

21. The system of claim 20, wherein the means for accessing the message with the log viewer comprises:
a means for accessing a first message on a first application server;
a means for accessing a second message on a second application server; and
a means for displaying the first message and the second message in a window of a graphical user interface of the log viewer client.

22. The system of claim 21, further comprising:
a means for selecting the first message in the first pane of the window;
a means for selecting the second message in the second pane of the window;

a means for merging the first message and the second message; and a means for displaying the first message and the second message in a third pane of the window.

23. The system of claim 20, further comprising:

a means for displaying a representation of the output destination in the log viewer;

a means for selecting the displayed representation of the output destination;

a means for opening a dialog window to access an attribute of the displayed representation of the output destination; and a means for setting an attribute of the selected output destination with the opened dialog window.

24. The system of claim 20, wherein the means for setting the attribute of the selected output destination comprises:

a means for setting a severity level of the output destination.

25. An article of manufacture comprising:

an electronically accessible medium providing instructions that, when executed by an apparatus, cause the apparatus to create an instance of a tracing controller associated with a specified program code region of an application, the tracing controller instance to receive and process tracing method calls generated by the application when the specified program code region is executed;

create an instance of a logging controller associated with a specified category related to the network, the logging controller to receive and process logging method calls from network components associated with the category;

provide a common application programming interface (API) of the tracing controller instance and the logging controller instance to control both the tracing controller instance and the logging controller instance, the common API defining an relationship between the specified program code region and the category, receiving via the common API a single method call of an application, generating both a log message of the logging module and a trace message of the tracing module in response to the single method call, the generating based on the defined relationship between the specified program code region and the category;

specify an output destination to receive via the common application programming interface of the tracing controller instance and the logging controller instance a message from at least one of the tracing controller instance and the logging controller instance; and access the message with a log viewer, the log viewer having a log viewer server and a log viewer client.

26. The article of manufacture of claim 25, wherein the instructions that, when executed by the apparatus, cause the apparatus to access the message cause the apparatus to access a first message on a first application server, the electronically accessible medium further providing instructions that, when executed by an apparatus, cause the apparatus to:

access a second message on a second application server; and display the first message and the second message in a window of a graphical user interface of the log viewer client.

27. The article of manufacture of claim 26, wherein the instructions that, when executed by the apparatus, cause the apparatus to display the first message and the second message in a window of a graphical user interface of the log viewer client cause the apparatus to display one or more messages of the output destination in the window of the graphical user interface of the log viewer client.

28. The article of manufacture of claim 27, wherein the electronically accessible medium provides further instructions that, when executed by the apparatus, cause the apparatus to search the one or more displayed messages to determine which, if any, of the displayed messages contain a search string.

29. The article of manufacture of claim 28, wherein the electronically accessible medium provides further instructions that, when executed by the apparatus, cause the apparatus to identify at least one of the one more displayed messages having the search string; and create a search results pane in the window of the graphical user interface; and display the identified message in the search results pane.

30. The article of manufacture of claim 25, wherein the electronically accessible medium provides further instructions that, when executed by the apparatus, cause the apparatus to display a representation of the output destination in the log viewer;

select the displayed representation of the output destination;

open a dialog window to access an attribute of the displayed representation of the output destination; and set an attribute of the selected output destination with the opened dialog window.

\* \* \* \* \*